US011349166B2

(12) United States Patent
Perez

(10) Patent No.: US 11,349,166 B2
(45) Date of Patent: May 31, 2022

(54) FIRE SUPPRESSANT ENCLOSURES FOR BATTERY CELL SYSTEMS AND ASSOCIATED METHODS OF MODULAR OPERATION

(71) Applicant: Luis Perez, Woodinville, WA (US)

(72) Inventor: Luis Perez, Woodinville, WA (US)

( * ) Notice: Subject to any disclaimer, the term of this patent is extended or adjusted under 35 U.S.C. 154(b) by 12 days.

(21) Appl. No.: 17/255,454

(22) PCT Filed: Jun. 28, 2019

(86) PCT No.: PCT/US2019/039967
§ 371 (c)(1),
(2) Date: Dec. 23, 2020

(87) PCT Pub. No.: WO2020/006503
PCT Pub. Date: Jan. 2, 2020

(65) Prior Publication Data
US 2021/0280929 A1    Sep. 9, 2021

Related U.S. Application Data

(60) Provisional application No. 62/691,536, filed on Jun. 28, 2018, provisional application No. 62/795,280, (Continued)

(51) Int. Cl.
*H01M 10/6568* (2014.01)
*H01M 10/48* (2006.01)
(Continued)

(52) U.S. Cl.
CPC ..... *H01M 10/6568* (2015.04); *H01M 10/486* (2013.01); *H01M 10/625* (2015.04);
(Continued)

(58) Field of Classification Search
CPC .................. H01M 50/202; H01M 10/6568
See application file for complete search history.

(56) References Cited

U.S. PATENT DOCUMENTS

2021/0320352 A1* 10/2021 Sandells ........... H01M 10/6566
2022/0006155 A1*  1/2022 Sasaki ................ H01M 50/129

FOREIGN PATENT DOCUMENTS

| CN | 104300097 B | 5/2017 |
| DE | 102013220957 A1 | 4/2015 |
| WO | 2010073809 A1 | 7/2010 |

OTHER PUBLICATIONS

International Search Report and Written Opinion in PCT/US2019/039967, dated Oct. 2, 2019. 7 pages.

* cited by examiner

*Primary Examiner* — Amanda J Barrow
(74) *Attorney, Agent, or Firm* — Luis Perez

(57) ABSTRACT

Battery systems and associated methods are described herein. A representative battery system includes: a plurality of individual battery units that each include a battery cell enclosed in a housing with a sensor therein configured to sense a physical characteristic of the battery cell; and a controller configured to connect/disconnect each battery cell according to its physical status to/from a device/system monitoring the battery system, such as an overarching vehicle control system. A battery system may comprising an energy storage cell; a cell container surrounding the energy storage cell and comprising at least one power output terminal and a test port; an external housing defining an enclosure configured to encompass the cell container; a conduit attached to the test port of the cell container and accessible through the external housing; and a valve positioned within the conduit and controlling fluidic flow through the conduit.

24 Claims, 15 Drawing Sheets

Related U.S. Application Data filed on Jan. 22, 2019, provisional application No. 62/795,298, filed on Jan. 22, 2019, provisional application No. 62/795,376, filed on Jan. 22, 2019.

(51) Int. Cl.
    *H01M 10/625*    (2014.01)
    *H01M 50/581*    (2021.01)
    *H01M 50/578*    (2021.01)

(52) U.S. Cl.
    CPC ....... *H01M 50/578* (2021.01); *H01M 50/581* (2021.01); *H01M 2220/20* (2013.01)

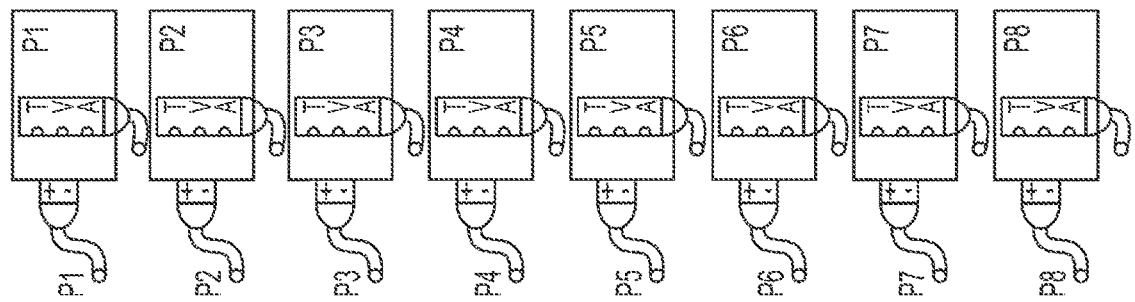
FIG. 6C
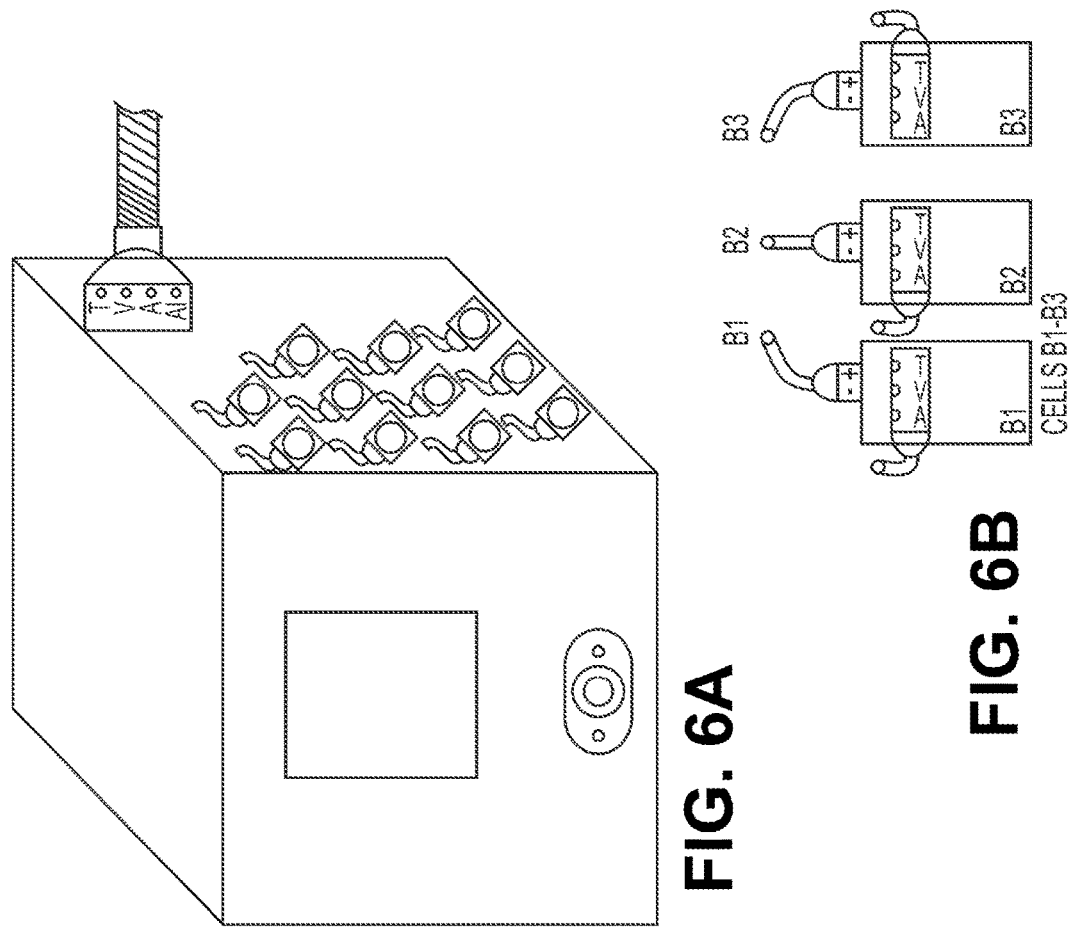
FIG. 6B
FIG. 6A

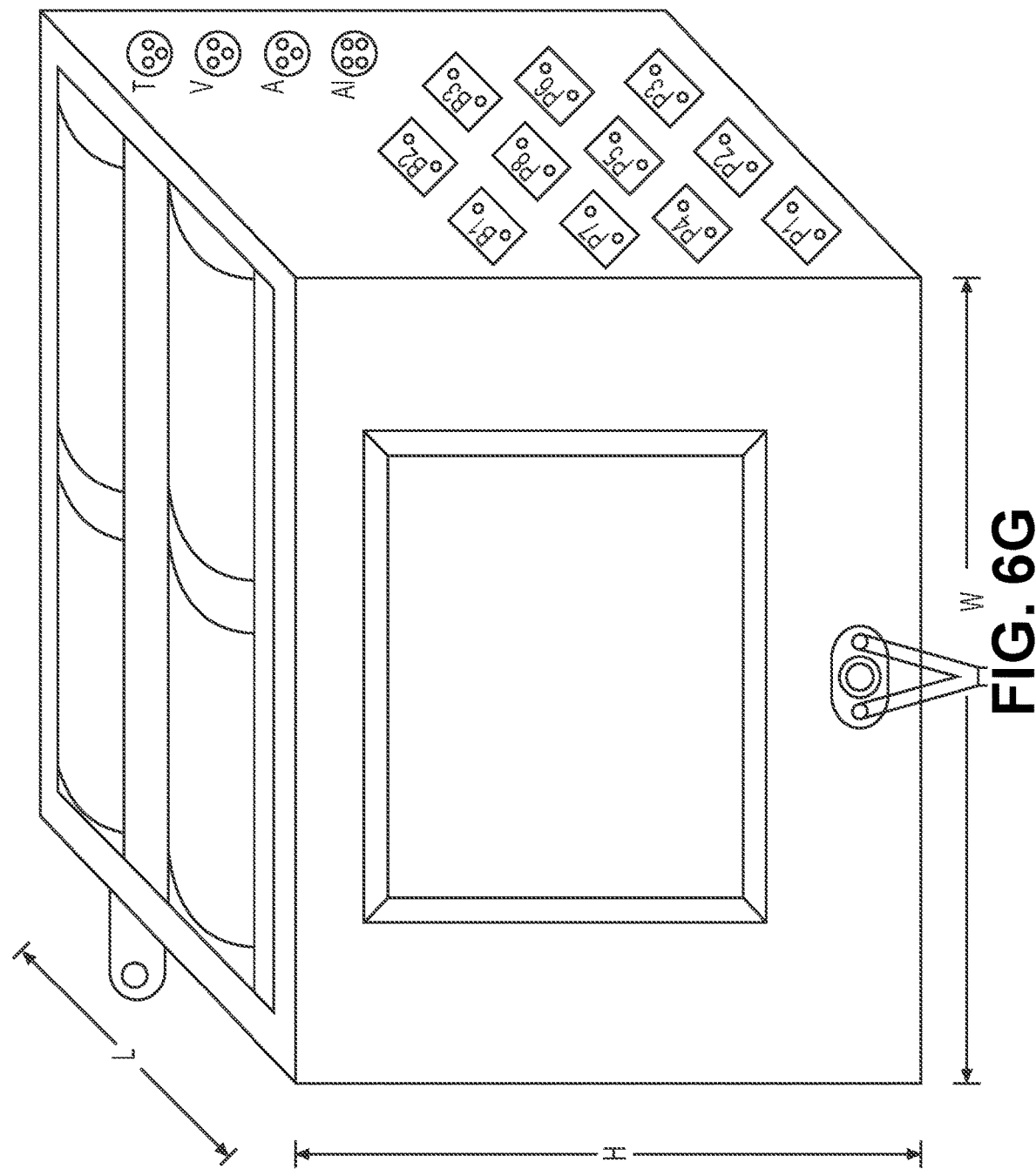

FIRE SUPPRESSANT ENCLOSURES FOR BATTERY CELL SYSTEMS AND ASSOCIATED METHODS OF MODULAR OPERATION

CROSS REFERENCE TO RELATED APPLICATIONS

This application is a United States National Phase Patent Application of International Patent Application Number PCT/US2019/039967, filed on Jun. 28, 2019.

This application claims priority to and incorporates entirely by reference U.S. Provisional Patent Application Ser. No. 62/691,536 filed on Jun. 28, 2018, and entitled Aircraft Battery System and Associated Methods of Operation.

This application claims priority to and incorporates entirely by reference U.S. Provisional Patent Application Ser. No. 62/795,298 filed on Jan. 22, 2019 and entitled Battery System and Associated Methods of Operation.

This application claims priority to and incorporates entirely by reference U.S. Provisional Patent Application Ser. No. 62/795,280 filed on Jan. 22, 2019 and entitled Battery System and Associated Methods of Operation.

This application claims priority to and incorporates entirely by reference U.S. Provisional Patent Application Ser. No. 62/795,376 filed on Jan. 22, 2019 and entitled Battery Cell Structure and Associated Methods of Operation.

TECHNICAL FIELD

The present technology is directed generally to electric battery systems for providing electrical power to mobile apparatuses, including but not limited to vehicles, and associated methods of manufacture and use. In particular, the technology is directed to safe enclosure structures for batteries such as lithium ion battery packs and associated systems.

BACKGROUND

Federal Aviation Regulations (FAR) govern use of electrical equipment on aircraft. For batteries, the FARs requires that storage batteries must maintain safe cell temperatures and pressures during charge/recharge operations, maximum regulated usage, and flight, including adverse conditions likely to occur during service, etc.

Modern aircraft include electrical equipment for various flight and non-flight functions. To power the electrical equipment, the aircraft include electrical batteries. These batteries often function as a main power source for starting engines and/or an auxiliary power unit (APU), as well as for emergency power. For example, during a normal start, the aircraft can utilize the electrical power provided by an external ground power unit (GPU). When a ground power start is not possible, the internal battery starts the APU, which then provides the power needed to start the one or more main engines. Also, in case of emergencies in which aircraft electrical power generation has failed (e.g. the ram-air turbine (RAT) is not available), the batteries serve as a power source to power essential-for-flight equipment for a limited duration (e.g., 30 minutes).

Current commercial aircraft typically use two main batteries that have a fixed size/electrical rating. Further, these batteries are often housed within heavy and relatively thick containment boxes. Such applications often increase the weight of the aircraft while providing unnecessary amounts of electrical capacity. Accordingly, there remains a need in the aircraft industry for a flexible and efficient battery system for delivering and managing electrical power within an aircraft.

BRIEF SUMMARY OF THE DISCLOSURE

In one non-limiting embodiment, battery system includes an energy storage cell, a cell container surrounding the energy storage cell, the cell container comprising at least one power output terminal and a test port, an external housing defining an enclosure configured to encompass the cell container, a conduit attached to the test port of the cell container and accessible through the external housing; and a valve positioned within the conduit and controlling fluidic flow through the conduit. At least a first sensor communication terminal is accessible through the cell container. The first sensor communication terminal may be connected to a temperature sensor within the cell container. The first sensor communication terminal is connected to a detection sensor tuned to determine a presence of a target analyte within the cell container. A cell end cap secures the cell container. The cell endcap defines the test port connected to the conduit. The cell endcap may be made of a carbon fiber polymer. A valve is configured for an opened position and a closed position respectively exposing and sealing the cell container relative to an outside environment. The conduit is a cell conduit connected to the test port, and the valve is a cell valve positioned within said cell conduit and configured for an opened position to allow access into the cell container from said cell conduit. In one non-limiting embodiment, a test circuit is connected to the cell conduit to gain access to an interior of said cell container. The fluidic flow may be a gaseous flow and/or liquid flow and may include a fire retardant agent. The test circuit includes a pressure test circuit that tracks a pressure reading for an interior of the cell container. The test circuit may include an air quality test circuit that tracks a presence of at least one analyte in the cell container.

In one non-limiting battery and power management system described herein, one inner bulkhead seals the external housing and defines at least a second sensor communication terminal having access to an interior of the external housing. Furthermore, an interior port defined by the inner bulkhead of the external housing is configured to connect to the test port of the cell container and a housing end cap, wherein the test port of the cell container and the interior port of the inner bulkhead are configured to connect to an access port defined within the housing endcap. An external housing conduit connects the access port within the housing endcap to the interior port of the inner bulkhead and the valve is positioned within said external housing conduit. The conduit may include a cell container conduit extending from said test port of the cell endcap to the interior port of the bulkhead and the external housing conduit extending from the bulkhead to the access port of the housing endcap. The cell container is pressurized to sea level atmospheric pressure with a compressed gas surrounding said energy storage cell. The compressed gas may be an inert gas at about 14.75 PSIG. The external housing is pressurized to sea level atmospheric pressure with a liquid additive positioned between said cell container and said external housing. The liquid additive is a flame-retardant fluid or may be a gas additive that is likewise flame retardant. The flame retardant fluid further serves as a heat sink for the battery units during an active operation of the battery units.

BRIEF DESCRIPTION OF THE DRAWINGS

FIG. 6A is a schematic representation of a controller according to aspects of this disclosure.

FIG. 6B is a schematic representation of battery cells according to aspects of this disclosure.

FIG. 6C is a schematic representation of battery cells according to aspects of this disclosure.

FIG. 6G is a schematic representation of a battery control system enclosure according to aspects of this disclosure.

DETAILED DESCRIPTION

Figure 1:
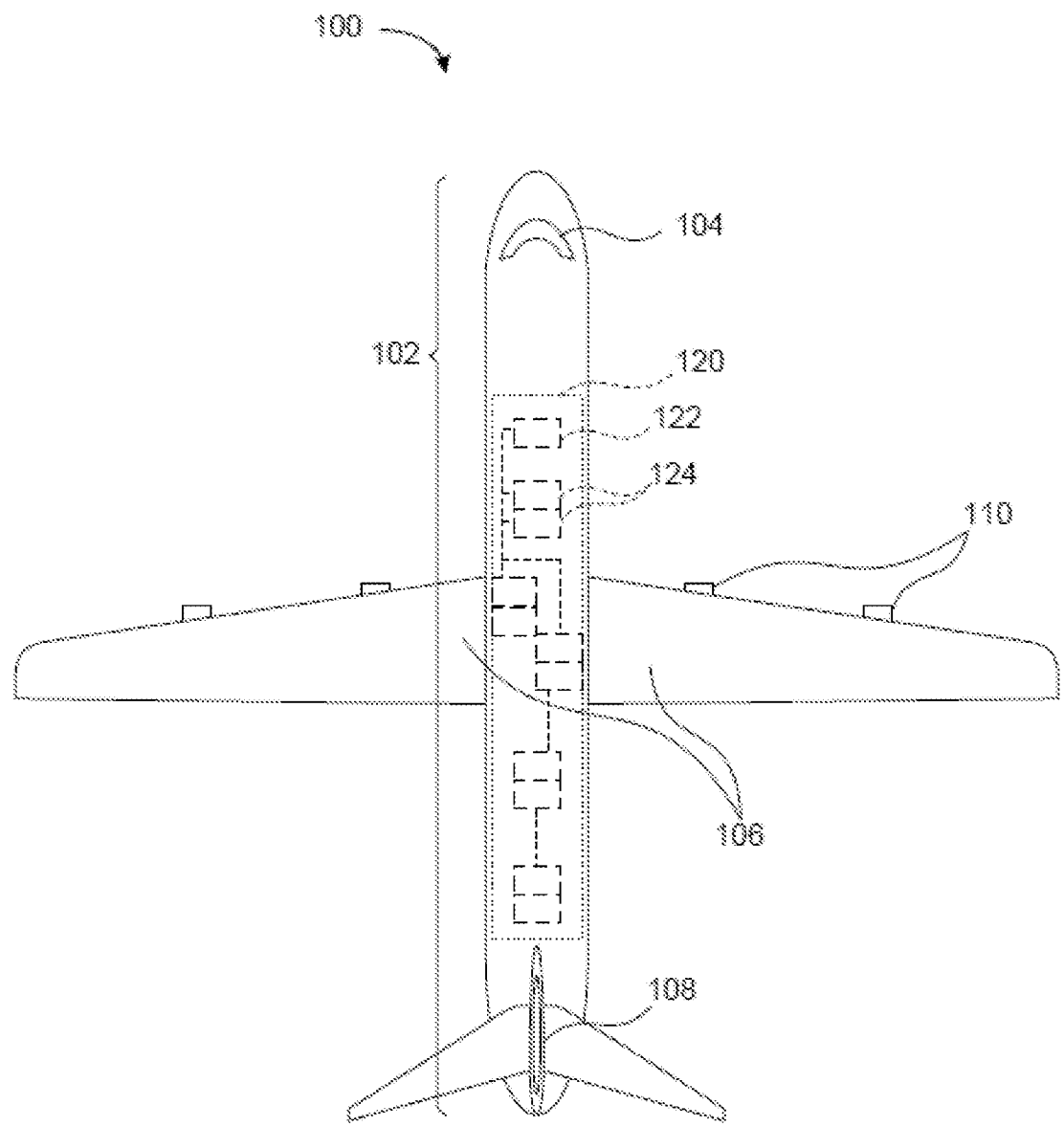
FIG. 1 is a partially schematic top view illustrating an aircraft having a representative battery system configured in accordance with some embodiments of the present technology.

The present technology is generally directed to battery systems that are configured to provide electrical power to aircraft (e.g., jet-propelled airplanes, propeller-driven airplanes, etc.). This technology, however, is not limited to any one kind of vehicle and can include other environments such as marine and automotive applications as well. In fact, certain industrial processes may also benefit from the disclosure set forth herein. In some embodiments, a battery system can include a set of individual battery units (also referred to herein as a "battery" in general, a "cell," "battery cell," or a "power cell" or an "energy source") and a controller that is configured to control operations (e.g., electrical connections) of the individual battery units according to one or more physical conditions of the corresponding battery unit. In this regard, the battery operations are subject to a distributed control system that incorporates a network of environmental sensors in either analog or digital communication with both the controller and at least one battery unit (preferably all of the battery units). As an example, each of the battery units can include a battery cell (e.g., a lithium ion or other type of dry/wet battery cell rated for a set/standard voltage/power level, such as 3.7 VDC) housed in a battery casing (e.g., titanium housing). Each of the battery units can further include one or more sensors, such as a voltage sensor, a current sensor, a temperature sensor (e.g., a thermocouple), a pressure sensor, an environmental air content sensor, a humidity sensor, fluidic flow sensors, and the like, that can provide data regarding the physical condition of the corresponding battery, the battery enclosure, the battery operating conditions, and the connection along either a power bus or a data bus connected to the controller. Based on the physical condition of the battery, the controller can operate a contactor/switch to connect or disconnect the individual battery from designated portions of the power circuit.

Embodiments of battery systems discussed herein can include construction and functionality that differs from current aircraft battery designs. For example, conventional main and secondary batteries can be replaced with the battery system, and the battery controller within the system can control each individual battery cell while simultaneously monitoring the state (health) of each battery for voltage, current draw, temperature or other sensed conditions. Further, each cell can be individually housed in its own titanium fire proof casing and can be located anywhere on the aircraft per the operator requirements. The controller can include a processor (e.g., a central processing unit (CPU), field-programmable gate array (FPGA), etc.) that is configured to at least control a connection between internal data buses and power buses with individual contactors for each cell. In some embodiments, each battery cell/unit can weigh less than 5 Lb, and the controller can weigh 12 Lb or less.

Embodiments of the battery system can include a varying number of battery units as required by the operator/aircraft. In some embodiments, the battery system can include eight primary cells and three backups cells (e.g., 3.7 VDC Li-ion cells). The battery system can be configured to provide at least 25 VDC with a capacity of at least 1500 Watt-hour and/or at least 50 Amp-hour. Accordingly, the total weight of the primary battery system can be about 67 LB or less. In some embodiments, the battery system can include a secondary sub-system configured to provide electrical power for emergency and backup uses. The secondary sub-system can include a smaller controller and four battery units, and the controller and the battery cells together can weigh a total of about 32 LB or less.

Accordingly, for some of the embodiments described above, total weight savings can be approx. 26 LB or more per aircraft, which can provide substantial fuel savings. In addition to the reduction in weight/load, the modular design of the battery system, in which each component/battery is physically separate and housed in its own casing, allows each portion to be replaced individually as a line replaceable unit (LRU) rather than replacing the entire battery system. In time-critical environments, such as commercial airplane maintenance (e.g., between scheduled passenger flights), the modular design can allow for rapid individual/modular replacements, which can save a significant amount of maintenance time. Further, the modular design can allow maintenance to focus on replacing only the deficient battery units, unlike conventional designs that package multiple battery cells within a single casing thereby requiring the entire unit (e.g., all encased battery cells) to be replaced for any maintenance (e.g., one defective cell).

Moreover, the individual battery control and individual encasement features of the present technology provides increased safety based on reducing battery overheating and the likelihood of fire, and reducing the likelihood of thermal runaway issues that may occur with conventional batteries. The separation between individual batteries can also isolate any thermal issues to only the affected battery, and prevent the thermal energy/state of one battery from directly affecting another battery.

Suitable Environments

The technology disclosed herein is suitable for permanent or semi-permanent stationary installations or may be used in vehicles or other mobile environments. Many of the examples discussed below use an air craft context to explain the disclosure, but that is not limiting of the disclosure or any embodiments. The term vehicle could include any apparatus used to transport people or inanimate objects.

FIG. 1 is a partially schematic top view illustrating an aircraft 100 having a representative battery system 120 configured in accordance with some embodiments of the present technology. The aircraft 100 can include a fuselage 102, which can house a cabin configured to carry a payload, such as passengers, luggage, cargo, etc., or a combination thereof. In some embodiments, the fuselage 102 can further house a flight deck 104 or cockpit that includes instrumentation and controllers for operation by pilot(s).

The aircraft 100 can include a set of wings 106 configured to provide lift for flight, takeoff, and landing. Also, the wings 106 can be shaped and/or located according to various configurations. For example, the wings 106 can be attached to or integral with the fuselage 102 according to configurations such as low/mid/high/shoulder/parasol wing configurations. In addition to the wings 106, the aircraft 100 can further include one or more control surfaces, such as stabilizers 108 (e.g., vertical and/or horizontal stabilizers), ailerons on the wings 106, etc., that provide for aircraft stability and control.

The aircraft 100 can further include a propulsion system 110 (e.g., one or more engines/motors, such as jet engines, turbofan engines, propeller engines, etc.) that are mated to the wings 106 and/or the fuselage 102.

The battery system 120 is configured to supply electrical power to one or more systems/subsystems (e.g., the propulsion system 110, emergency systems, instrumentation systems, etc.) in the aircraft 100. For example, in some embodiments, the battery system 120 can provide electrical power to initiate engine/motor start, power the one or more systems/subsystems during flight, etc. For example, the battery system 120 can be configured to provide power to an auxiliary power unit (APU), one or more pumps (e.g., hydraulic AC motor pump, fuel pump, etc.), heaters, fans, igniters, flight deck systems, a horizontal situation indicator (HSI), etc. In commercial flight/airplane applications, the aircraft 100 can draw electrical power from an external ground source when it is stationed at a gate/port. In preparing for takeoff, the aircraft 100 can switch from the external ground source to the battery system 120 for electrical power.

The battery system 120 can include a controller 122 operably and electrically connected to a plurality of battery units 124 (e.g., wet or dry batteries configured to store and provide electrical energy, such as Lithium Ion batteries). The controller 122 can include a special purpose computer or data processor that is specifically programmed, configured, or constructed to perform one or more of the computer-executable instructions described in detail herein. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random-access memory (RAM), read-only memory (ROM), flash memory, or the like, or a combination of such components.

The controller 122 and/or the battery units 124 can be mounted to the aircraft 100 in various locations. In other words, the controller 122 and/or each of the battery units 124 can each have its own housing, and be separately attached/mounted to the aircraft 100 in virtually any arrangement that is advantageous for, e.g., accessibility, weight and balance, servicing, etc.

The controller 122 can be configured to manage usage of the battery units 124. In some embodiments, the controller 122 can determine a physical condition (e.g., temperature, voltage/current capacity or output, etc.) of each of the battery units 124 or the battery cells therein. The controller 122 can be configured to electrically connect/disconnect each of the battery units to the aircraft's electrical load based on the determined physical condition. Further details regarding the controller 122 and the battery units 124 are described below.

Description of Various Aspects of the Battery System

Figure 2:
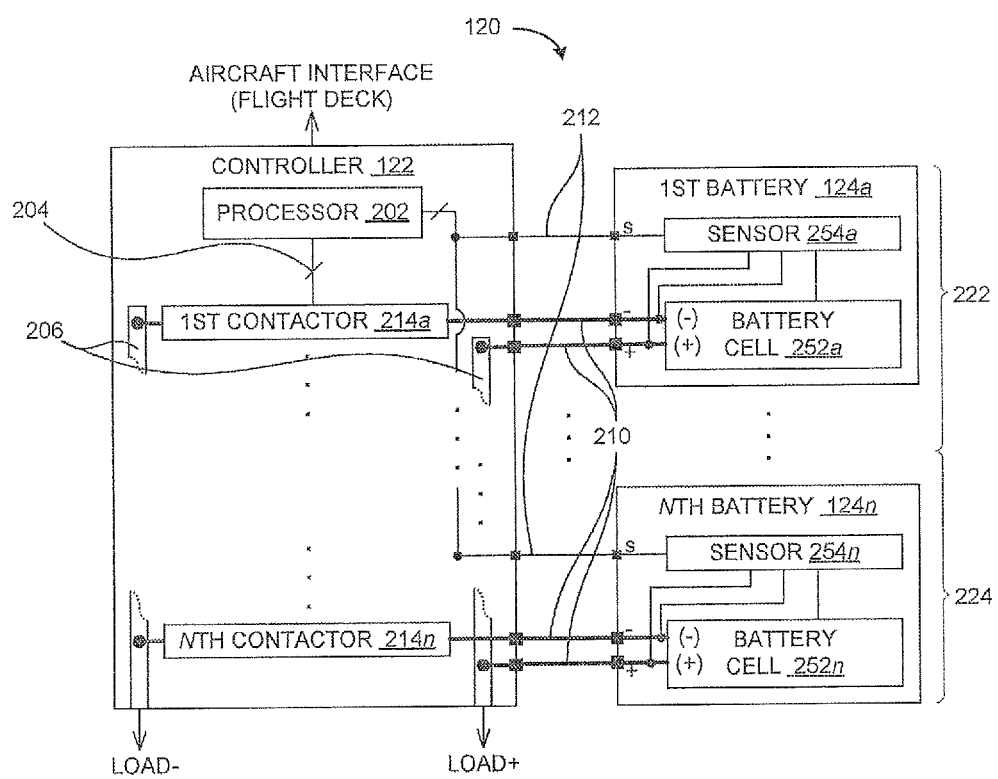
FIG. 2 is a block diagram of the battery system configured in accordance with some embodiments of the present technology.

FIG. 2 is a block diagram of the battery system 120 configured in accordance with some embodiments of the present technology. As discussed above, the battery system 120 can include the controller 122 and the battery units 124. In some embodiments, each of the battery units 124 (e.g., each of the battery units 124a through 124n) can include a battery cell 252, a sensor 254, etc. For example, the battery unit 124a can include the sensor 254a and the battery cell 252a and the battery unit 124n can include the sensor 254n and the battery cell 252n. The battery cell 252 can include electrical storage component(s) configured to store and provide a predetermined amount of electrical energy. For example, in some embodiments, the battery cell 252 can include a Lithium Ion battery cell. In other embodiments, the battery cell 252 can include wet cell, plates, etc. In some embodiments, the battery cell 252 can have a voltage capacity of 3.7 VDC. In other embodiments, the battery cell 252 can have a voltage capacity of 1.2 VDC, 4 VDC, or other voltage capacities.

In some embodiments, the controller 122 can include a processor 202 (e.g., a computing device, such as a CPU, an FPGA, etc.), a set of contactors 214 (e.g., contactors 214a through 214n), etc. The contactors 214 can include mechanical/electrical devices (e.g., switches, relays, etc.) configured to create and break electrical connections, such as by closing and opening a relay/switch/contact therein. Each of the contactors 214 can be configured to electrically connection/disconnect a corresponding one of the battery units 124 to/from an electrical load (e.g., the APU, HSI, etc.) of the aircraft 100 of FIG. 1. For example, each of the contactors 214 can be electrically connected (e.g., such as through a direct connection using power cable/wires 210) to one of the terminals (e.g., the negative terminal) on the one corresponding battery unit (e.g., the first contactor 214a connected to the first battery 124a, the nth contactor 214n connected to the nth battery 252n, etc.).

This disclosure shows numerous embodiments directed toward the independence of individual battery cells in terms of both control system architecture and power bus engagement. Regarding the control system architecture, this disclosure illustrates that numerous data points may be gathered within and/or around individual battery cells, whether positioned alone or as part of a group of battery cells. The data points may correlate to particular sensor output signals or may be derived from combinations of sensor output signals. The data points are assimilated into memory associated with the controller, stored for historical computing and reporting purposes, and used to direct the distributed control operations detailed herein. For example, and without limiting the disclosure to any one embodiment, the distributed control system utilizes at least one output from the controller to direct operation of hardware within the control system architecture, instrumentation installed at or around each battery cell or group of battery cells, and connection apparatuses positioned between the battery cells and a respective data bus or power bus. As shown in the attached drawings, the contactors 214 illustrated in the attached figures can be configured (e.g., wired) either to electrically isolate at least one battery cell on a network (i.e., leaving the battery terminals electrically disconnected from the aircraft load and/or data buses) or to connect the corresponding battery in series (e.g., by connection to the positive terminal of the next sequential battery unit) with other batteries. The contactors 214 can be further configured to connect the series-connected battery units to a power bus 206 that is configured to provide the electrical power to the load. In another embodiment, that does not limit the scope of the disclosure, the distributed control network of battery cells, sensors, and computerized data processing components may be installed with the option of utilizing battery cells connected in parallel with respect to a designated battery power bus that is separate from a main power bus for an overall vehicle or aircraft. By connecting at least one, and often a plurality of battery cells on a respectively designated power bus, driven only by respective battery cell power sources, the designated power bus may be connected and disconnected to a vehicle main power bus in another level of modularity. In other words, a distributed control system according to this disclosure may be described as modular in regard to independent battery cells that are selectable for inclusion or contribution to a requisite power profile and/or individually replaceable on a battery cell power network. It is notable, however, that the distributed control system described here further encompasses another level of modularity by providing hardware and instrumentation that allows for a battery driven, designated power bus within a vehicle to be segmented within a battery-operated power grid that is connectable to a main power bus in a vehicle. Along these lines, the power grid, supported by the cells described herein may include branch segments that connect across switching hardware to connect and disconnect each segment from the power grid. The power grid, in turn, is switchable for inclusion onto a main power bus within the vehicle. Accordingly, by making individual battery cells, groups of battery cells, sections of a designated battery power bus, and the entirety of a designated battery power bus switchable in and out of operation as part of a main power supply bus in a vehicle, the distributed power control system disclosed herein adds layers of opportunity for artificial intelligence operations to assimilate and combine power sources in a most efficient manner.

Before delving into the operation of the controller, another important aspect of this disclosure lies in opportunities that the systems, methods and apparatuses disclosed herein provide regarding wireless data transmission and wireless power transmission in a vehicle. By segmenting a battery-based power grid as a designated power bus for battery operations, this disclosure shows the architecture that allows for wireless data transmission to and from battery cells and wireless power distribution within at least one of the above noted segments. One aspect of wireless power distribution in any system lies in the distances at which power signals can be transmitted without requiring transmitters and receivers that basically defeat the gained efficiencies. By segmenting a battery driven power grid into smaller sub-sections of a designated power bus for battery power transmission, numerous segments can be equipped with smaller but efficient power transmission and reception equipment for that particular segment.

The processor 202 can be operably connected to the power bus 206, such as through an internal sensor (e.g., a voltage sensor and/or a current sensor, not shown) and monitor the output voltage/current/power of the controller 122 based on monitoring the power bus 206. In some embodiments, the processor 202 can be configured to connect or disconnect battery units based on the voltage/current flowing through the power bus 206. For example, the processor 202 can be configured to dynamically manage/vary a quantity of connected battery units 124 to maintain a minimum amount of voltage/current through the power bus 206.

The processor 202 can be configured to command/control the contactors 214 via control connections 204 (e.g., wires, traces, etc.). The control connections 204 can communicate various information, such as commands from the processor 202 to the contactors 214 (e.g., to open/close the electrical connections), status from the contactors 214 to the processor 202, etc.

The processor 202 can also be configured to communicate information to/from a computing system/device associated with the aircraft 100 and/or the flight deck 104, both of FIG. 1. The processor 202 can also receive and execute commands from the computing system/device of the flight deck on the aircraft 100. The processor 202 can also send information regarding status/condition of the battery units 124 to the computing system/device through the aircraft interface (e.g., data cable/bus, relays, subsystems, etc.).

In some embodiments, the contactors 214 and the power bus 206 can be separate from the controller 122 and/or the processor 202. For example, the processor 202 can be positioned in a controller housing, and the contactors 214, the power bus 206, or a combination thereof can be located outside of the controller housing. The control connections 204 can extend outside of the housing and connect to the contactors 214. Also, the power connections 210 can connect the battery units 124 to the contactors 214 and/or the power bus 206 outside of the controller housing.

In some embodiments, the battery units 124 can include a primary set 222 and a backup set 224. At any given time (e.g., before initiating engine start for the aircraft 100 of FIG. 1), the primary set 222 can include the battery units 124 that are connected to the power bus 206, and the backup set 224 can include the battery units 124 that are disconnected from the power bus 206. The controller 122 can be configured to operate the contactors 214 to replace one or more of the battery units in the primary set 222 with one or more of the battery units in the back up set 224. For example, the controller 122 can operate one of the contactors 214 to disconnect a corresponding battery unit 124 from the power bus 206 if the battery unit 124 has an output voltage level, an output current level, a current temperature, etc. that is outside of corresponding threshold ranges. Also, the controller 122 can select one of the backup battery units 124 to replace the disconnected battery unit 124, and operate a corresponding contactor to connect the replacement battery 124 to the power bus 206.

As described above, the controller 122 can be operably (e.g., electrically) connected to the battery units 124 (e.g., battery units 124a through 124n). In some embodiments, the controller 122 can be operably connected to the battery units 124 through sensor connections 212 (e.g., signal/data conductors, such as wires, traces, etc.) configured to communicate sensor data/commands from the sensors 254 to the processor 202. The sensor connections 212 can be connected between the controller 122 and the battery units 124, such as through direct connection to corresponding connectors/ports thereon. For example, the sensor connections 212 can include a dedicated connection between the controller 122 (e.g., the processor 202) and each of the battery units 124. Also, the sensors 254 (e.g., voltage sensor, current sensor, temperature sensor, etc.) can be configured to communicate data and/or commands associated with one or more physical conditions, such as the voltage, the current, the temperature, etc., of the corresponding battery unit 124.

The controller 122 (e.g., the processor 202 therein) and the battery units 124 can be further operably connected through the power connections 210 (e.g., cables, wires, etc.). For example, the controller 122 can be connected to the positive and negative voltage terminals of each of the battery units 124 through the power connections 210.

Figure 3:
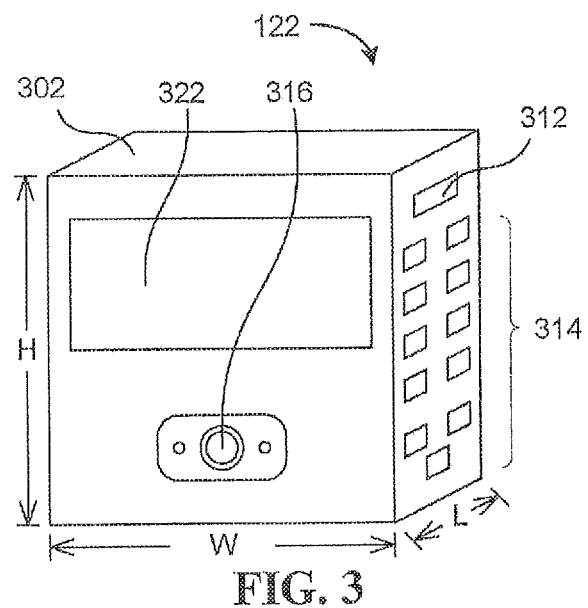
FIG. 3 is a partially schematic isometric view of a controller configured in accordance with some embodiments of the present technology.

FIG. 3 is a partially schematic isometric view of a controller (e.g., the controller 122) configured in accordance with some embodiments of the present technology. The controller 122 can include a controller housing 302 that encases the internal components, such as the processor 202 of FIG. 2, the contactors 214, the control connections 204, the power bus 206, etc., described above in reference to FIG. 2. The controller housing 302 can separate/isolate the controller components from the environment and the battery units 124 of FIG. 1. In some embodiments, the controller housing 302 can be manufactured from titanium, such as titanium plate or sheet that is manufactured or otherwise formed and assembled using suitable methods known in the art.

In some embodiments, the dimensions of the controller housing 302 can be chosen to meet a design/need of the aircraft 100, and/or comply with an industry standard. In one example embodiment, for example, the controller housing 302 can have a width of 18 inches, a length of 12 inches, and a height of 12 inches.

The controller 122 can include a first connector set 312, a second connector set 314, etc. operably/electrically connected to one or more of the components therein. For example, the first connector(s) 312 can be configured to communicate with the battery units 124 and/or other aircraft systems data and/or commands associated with the physical condition (e.g., voltage, current, temperature, etc.) of the batteries in the battery system 120. For example, the first connector set 312 can include one or more connectors that correspond to the sensor connections 212 of FIG. 2. The second connector set 314 can be configured to receive electrical power from the battery units 124. For example, the connector set 312 can correspond to the power connections 210 of FIG. 2. In some embodiments, each of the connectors 314 can correspond to one of the battery units 124.

The controller 122 can further include a power connector set 316 operably/electrically connected to one or more of the components therein. The power connector set 316 can correspond to the power bus 206 of FIG. 2. The power connector set 316 can provide an electrical connection to the electrical load (e.g., APU, HSI, pumps, heaters, fans, etc.) of the aircraft 100 of FIG. 1. In some embodiments, the stored electrical energy in the battery units 124 can flow through the second connector set 314, the internal components (e.g., the contacts 214, the power bus 206, etc.), and then through the power connector set 316 to the electrical load. The processor 202 can determine the physical condition of the battery units 124 based on the sensor information received through the first connector set 314. As described above, the processor 202 can use the received sensor information to control the electrical connection of the battery units 124 to the aircraft electrical load.

In some embodiments, the controller 122 can include a user interface 322 (e.g., a display, a touch screen, a keyboard, a set of input buttons, etc.). The user interface 322 can be removably attached to or integral with the controller housing 302. The user interface 322 can be electrically/operably connected to the processor 202, and can be configured to present prompts and/or other information to a human operator (e.g., maintenance personnel, ground crew, etc.), and receive commands and/or other input from the operator, such as during a troubleshooting situation. For example, the user interface 322 can display details regarding any errors or conditions of the battery units 124, components internal to the controller 122 (e.g., contactors), etc. Also, the user interface 322 can receive status information from the human operator, such as confirmation for taking batteries offline or installed/connected status of replacement batteries, etc.

Figure 4:
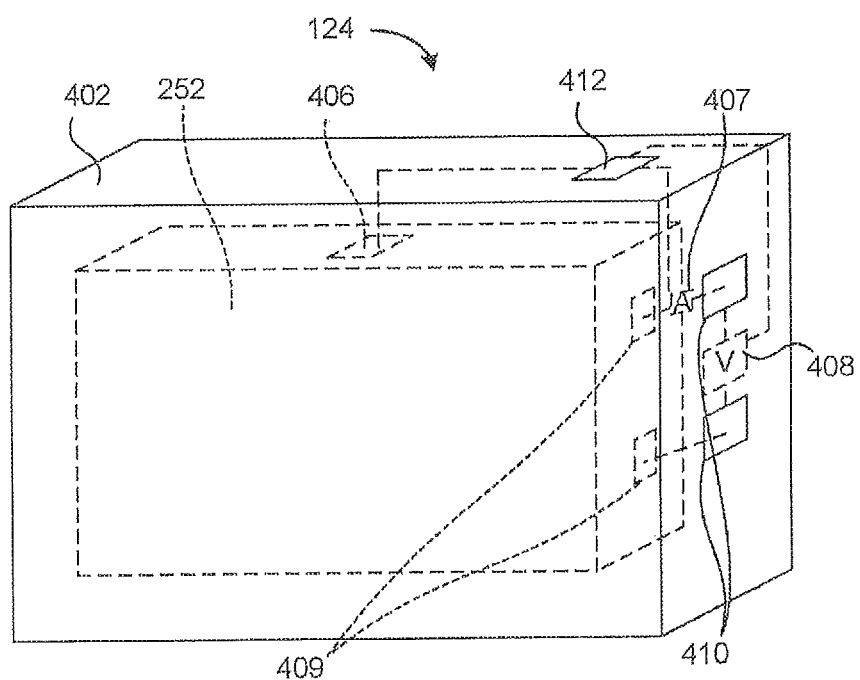
FIG. 4 is a partially schematic isometric view of a battery unit configured in accordance with some embodiments of the present technology.

FIG. 4 is a partially schematic isometric view of one of the battery units 124 configured in accordance with some embodiments of the present technology. The battery unit 124 can represent one or more of the battery units 124a-124n of FIGS. 1-2.

The battery unit 124 can include a battery housing 402 that encloses internal components, such as the battery cell 252, one or more sensors 254, internal electrical connections, etc. The battery housing 402 can separate/isolate the battery cell 252 from the environment, the controller 122 of FIG. 1, etc. In some embodiments, the battery housing 402 can be manufactured from titanium to save weight. Enclosing the battery cell 252 in a titanium housing instead of a steel housing and/or a combined outer housing can reduce the overall weight of the battery system 100.

As described above, the battery cell 252 is a device/unit configured to store and provide electrical energy. In some embodiments, the battery cell 252 can be a wet/chemical or dry (e.g., Lithium Ion) battery cell. In some embodiments, the battery cell 252 can be configured to provide 3.7 VDC. In other embodiments, the battery cells 252 can be configured to provide 1.2 VDC or other voltages. The battery cell 252 and the battery housing 402 can be designed to meet or exceed flight-related regulations (e.g., FAR). For example, the battery housing 402 can be spaced apart from the exterior surface of the battery cell 252 along one or more directions for isolating any discharge from the battery cell 252. Also, the battery housing 402 can include a pressure relief mechanism (e.g., a vent valve; not shown) configured to regulate an internal pressure therein. Also, the battery housing 402 can be mated to the aircraft 100 via vibration isolators (not shown) to reduce shock loads.

The battery unit 124 can include the one or more sensors 254 configured to determine/measure various physical conditions of the battery cell 252. For example, the one or more sensors 254 can include a voltage sensor 408, a current sensor 407, a temperature sensor 406 (e.g., a thermocouple), etc. The temperature sensor 406 can be connected to a body of the battery cell 252, and the voltage sensor 408 and/or the current sensor 407 can be connected to one or more battery cell terminals 409 on the battery cell 252, one or more power connectors 410 on the battery housing 402, or a combination thereof for determining the corresponding physical conditions. The sensors 254 (e.g., the temperature 406, the current sensor 407, the voltage sensor 408, etc.) can also be connected to a sensor connector set 412. The sensor connector set 412 can include a plug or other connector receptacle configured to provide the sensor readings to the controller 122. For example, the sensor connector set 412 can correspond to the first connector set 312 of FIG. 3, the sensor connections 212 of FIG. 2, etc.

The battery cell terminals 409 can be electrically connected to the power connectors 410. For the battery system 120, the power connectors 410 can be electrically connected to power connectors on the controller 122 (e.g., the second connector set 314), the power connections 210 of FIG. 2, etc. The battery unit 124 (e.g., the battery cell 252) can provide stored electrical energy to the electrical load of the aircraft 100 via the controller 122 or through an external power bus and contactors (i.e., as regulated by the controller 122).). As a final safety measure, there will be physical fuses to permanently disconnect the battery cells from the main bus in case of a dangerous, catastrophic event such as a short or thermal runaway. The fuses will be internal to the individual cell and will be replaced as a unit during a maintenance event.

This disclosure also takes into account distinct logistical improvements to battery units contributing to the power needs of a vehicle, such as an airplane. For example, in one embodiment electro-magnetic field emissions from power lines and even data lines may be controlled to a maximum extent by wire shielding, but also, by segmenting a power distribution architecture into connecting and disconnecting portions of a power grid. The control system described below may be equipped with computerized software and appropriate algorithms to control secondary factors such as electromagnetic radiation distribution, thermal distribution, and even high frequency noise distribution due to power transmission.

Example Flow Routine for a Battery System

Figure 5:
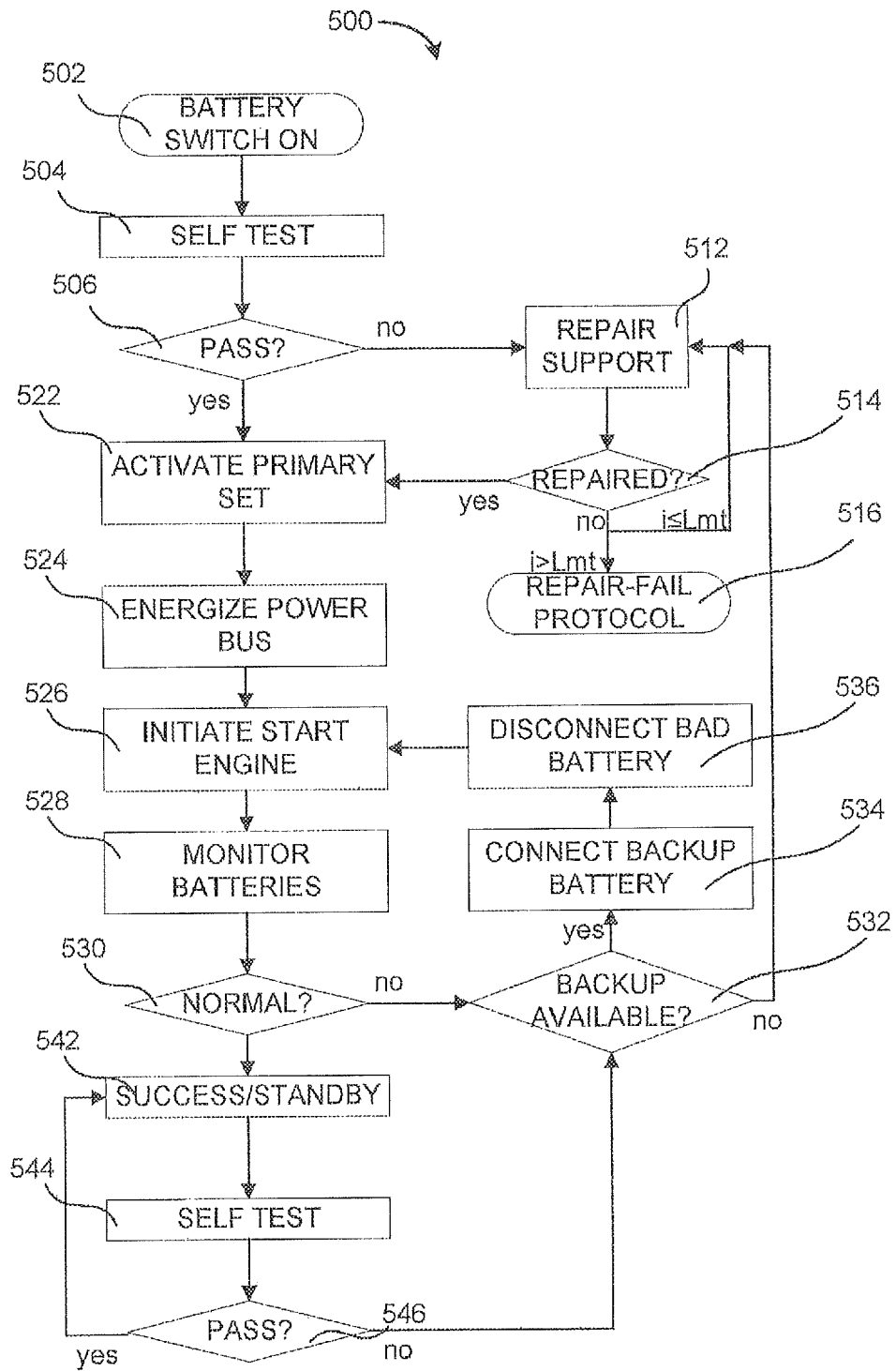
FIG. 5 illustrates an example operational flow of the battery system in accordance with some embodiments of the present technology.

FIG. 5 illustrates an example operational flow 500 of the battery system 120 of FIG. 1 in accordance with some embodiments of the present technology. The operational flow 500 can correspond to a method of operating the battery system 120 (e.g., the controller 122 and the battery units 124 of FIGS. 1 and 2) for the aircraft 100 of FIG. 1.

At block 502, the aircraft 100 can switch on to the battery system 120 for electrical power. The aircraft will be capable of drawing initial, power-up electricity from the battery system if ground power is not available, or if insufficient ground power is available for power-up procedures, the aircraft 100 may draw as much power as available from ground power and use the system disclosed herein to supplement the same. For example, the aircraft 100 can initially draw electrical power from a power source on the ground/aircraft terminal prior to takeoff for flight operations. In initiating the flight operations, such as prior to moving away from the terminal and taking off, the aircraft 100 can be disconnected from the ground/terminal power source switched on to the battery system 120 as the source of electrical energy.

At block 504, the battery system 120 (e.g., the processor 202 of FIG. 2) can implement a self-test (e.g., a diagnostic) process. The self-test process can include a series of steps configured to determine an operational status of the battery system 120. For example, the self-test process can determine whether each of the battery units 124 are operational or defective, whether the battery units 124 have sufficient electrical energy stored therein, etc.

In some embodiments, the battery system 120 can implement the self-test process based on checking conditions/status of one or more components therein. For example, the self-test process can include self-testing the processor 202. The processor 202 can perform a validation process for checking its own status/health, such as a checksum-validation for stored information/instructions, an electrical connectivity/voltage at the processor 202, etc. If the processor 202 does not provide satisfactory self-test results, the processor 202 can communicate a fault message to the flight deck and/or the ground station, support processor repair efforts (e.g., as represented in blocks 512-514 and described below), remain offline/standby for the repair efforts (e.g., as represented in block 516 and described below), etc., and the self-test process can result in a fail condition.

If the processor 202 provides satisfactory self-test results, the processor 202 can iteratively verify each of the battery units 124. For example, the processor 202 can close one of the contactors 214, read voltage, temperature, etc. of the corresponding battery unit for each iteration. The processor 202 can test a different unit for each iteration, such as according to a preset sequence, until all battery units are tested. If one or more battery units 124 correspond to a condition outside of operational conditions (e.g., temperature and/or voltage outside of preset ranges), the processor 202 can notify an external system (e.g., flight deck, ground system, etc.) and/or block 512. If all battery units 124 correspond to satisfactory operational conditions, the processor 202 can operate the contactors connect the primary set 222 in series and/or to the power bus 206. The processor 202 can verify that the resulting voltage of the combined set of battery units 124 satisfies the system requirement. If the resulting voltage satisfies the system, the processor 202 can notify the flight deck of the status and the flow can proceed to block 522. If the resulting voltage is outside of the operating requirement, the processor 202 the processor 202 can communicate the fault message to the flight deck and/or the ground station, support processor repair efforts, remain offline/standby for the repair efforts, etc., and the self-test process can result in a fail condition. In some embodiments, the processor 202 can test alternative sets of battery units, such as based on swapping one or more of the units from the primary set 222 with units from the backup set 224 (e.g., units that satisfied the individual unit checks) according to a preset sequence/routine. The processor 202 can reset the primary set 222 when one of the combinations provides satisfactory system voltage and/or provide the failing condition/unit to one or more external systems.

At decision block 506, the battery system 120 determines whether the self-test process satisfied preset requirements (e.g., temperature/voltage requirements for individual battery units and/or system voltage requirement). If the self-test process determines that the battery system 120 or a portion thereof is not in operational condition (e.g., fail condition, such as battery cell voltage/temperature being outside of an operating range), the battery system 120 can request repair/maintenance support, as illustrated at block 512. For example, the battery system 120 (e.g., the processor 202) can communicate an error message (e.g., indication of failure, details regarding the failure, such as test results and/or readings/measurements, etc.) to the flight deck 104 of FIG. 1 and/or a system outside of the aircraft 100 (e.g., a ground station, maintenance request system, etc.). Also, the battery system 120 can interact with the maintenance personnel through the user interface 322 of FIG. 3 for assisting the repair/maintenance efforts.

At decision block 514, the battery system 120 can determine if the repair/maintenance is successful. For example, the battery system 120 can receive confirmations regarding repair/maintenance completion through the user interface 322. Also, the battery system 120 can re-implement the self-test process, as discussed above for block 504. In some embodiments, the battery system 120 can re-initiate the repair support in block 512 when the repair/maintenance fails. In some embodiments, such as after a predetermined number of loops or repair sessions or a predetermined amount of time (e.g., i>Lmt), the battery system 120 can implement a protocol/process that corresponds to a failed repair process, such as illustrated in block 516. For example, if the battery system 120 has a sufficient number of operational battery units that passed the self-test process, the battery system 120 can log the battery unit(s) that failed the self-test as a backup unit that is not available for use. The aircraft 100 can operate with the remaining operating set of battery units, and the flow can proceed to block 522. Alternatively, if the battery system 120 does not have a sufficient number (i.e., according to a preset limit) of operational battery units, the battery system 120 can initiate a process for taking itself offline and wait for operator input (e.g., for a system reset or for a more comprehensive repair effort). The battery system 120 can remain in standby state for an operator update/reset after going offline.

When the self-test process or the repair process is successful, such as illustrated at block 522, the battery system 120 can activate the primary set 222 of the battery units 124 of FIG. 2. For example, the processor 202 can activate the contactors 214 to connect the primary set 222 to the power bus 206. As a result, at block 524, the battery system 120 can energize the power bus 206. In some embodiments, the battery units 124 can provide electrical power to the aircraft load (e.g., APU) through the power bus 206.

In some embodiments, the aircraft 100 (e.g., APU) can initiate an engine start process as illustrated at block 526. For example, the APU can use the electrical power from the battery units 124 to begin operation of the airplane propulsion system (e.g., jet turbine engine, internal combustion engine, electric motor, etc.). While the battery units 124 provide the electrical power to one or more systems in the aircraft 100, the battery system 120 (e.g., the processor 202) can monitor the physical conditions (e.g., output voltage, output current, temperature, etc.) of each of the battery units 124, such as illustrated at block 528. At decision block 530, the battery system 120 can evaluate the physical conditions and determine if the operating conditions are normal or within predetermined operating parameters/thresholds. For example, the battery system 120 can compare the voltage readings, the current readings, and/or the operating temperatures, etc. of each battery unit 124 to corresponding preset threshold ranges.

If one or more of the batteries 124 have a physical condition that falls outside of the corresponding threshold range, the battery system 120 can provide notice/flag to stop the engine start process and/or determine whether there are any operational backup batteries 124 in the backup set 224, as shown at decision block 532. If no operational backup batteries are available, the battery system 120 can initiate the repair/maintenance support request process at block 512 and continue with the corresponding processes described above. Conversely, when the battery system 120 includes operational backup battery units, the battery system 120 can connect one of the backup battery units, as shown at block 534. For example, the processor 202 can operate the corresponding contactor 214 to connect the backup battery to the power bus 206. Also, at block 536, the battery system 120 can disconnect the primary battery that failed the physical condition(s) test. For example, the processor 202 can operate the corresponding contactor 214 to disconnect the failing battery from the power bus 206. Accordingly, the battery system 120 can replace the failing battery with one of the backup units. With the replaced battery, the aircraft 100 can re-initiate/maintain/continue with the start-engine process, as described above for block 526, and the battery system 120 can monitor the battery units 124 and/or the contactors 214, as described above for block 528.

At block 542, such as when the physical conditions of the battery units 124 (e.g., the battery cells therein) are within the preset/operating parameters (e.g., normal), the battery system 120 can continue to provide electrical power to the aircraft load (e.g., APU). In some embodiments, once the engine start process is successful, the battery system 120 can enter standby mode, such as during flight operations of the aircraft 100. In some embodiments, the aircraft 100 can use a generator system to provide electrical power based on operation of the aircraft engine instead of using the battery system 120.

At block 544, the battery system 120 can conduct the self-test process during the flight operations of the aircraft 100. The self-test process can be similar to the process described above at block 504. At block 546, the battery system 120 (e.g., the processor 202) can evaluate the results of the self-test process. If the battery units 124 are within correct operational ranges according to the self-test process, the battery system 120 can remain in the flight operational state (e.g., standby or powering the electrical motors) as illustrated in block 542. If any one of the battery units 124 are not within safe operating range (e.g., battery physical conditions outside of operating thresholds), the routine can pass to decision block 532 described above.

In some embodiments (not shown in the routine 500), the battery system 120 can further provide electrical power to other electrical loads during flight/emergency operations. For example, when the electrical power (e.g., voltage and/or current) from the generator falls outside of operating thresholds (e.g., during emergency conditions), the aircraft 100 can command the battery system 120 to provide the electrical power. The battery system 120 can connect the available/operational battery units (e.g., corresponding to the current primary set) to the power bus 206 based on the command from the aircraft computer device/system. Accordingly, the battery system 120 can power the necessary aircraft load, such as the APU, etc.

Figure 6D:
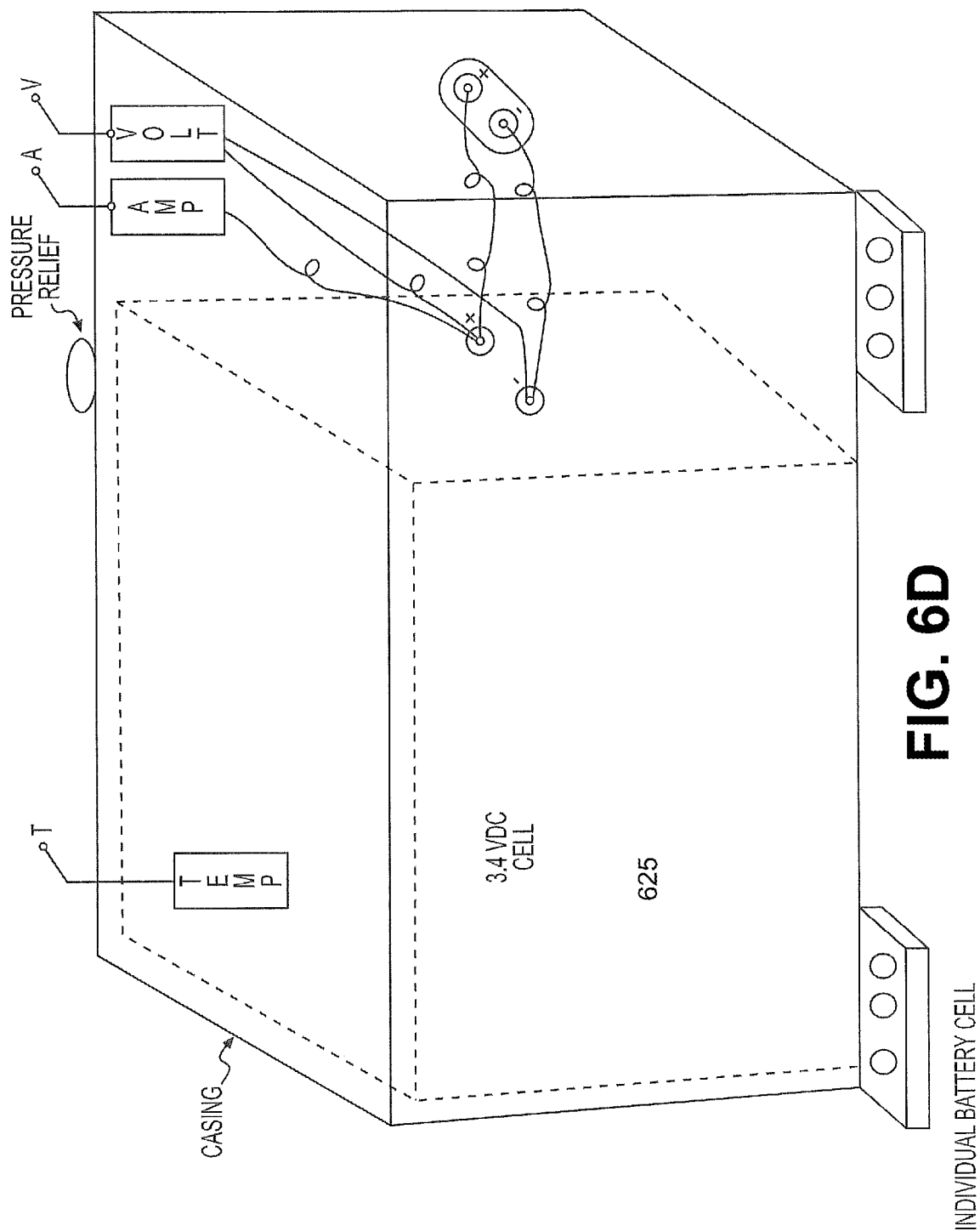
FIG. 6D is a schematic representation of battery cells according to aspects of this disclosure.
Figure 6E:
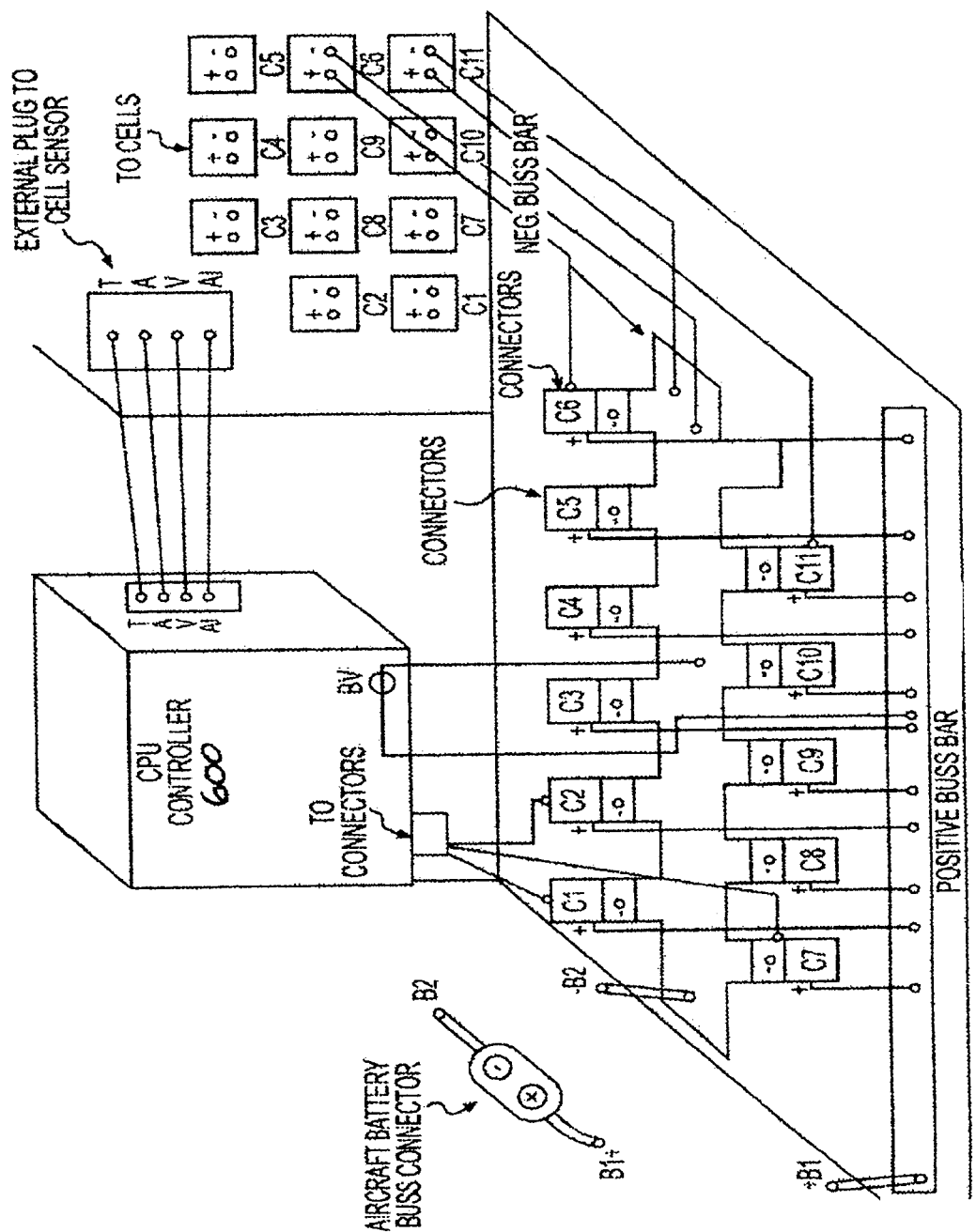
FIG. 6E is a schematic representation of a battery power management and control system according to aspects of this disclosure.
Figure 6F:
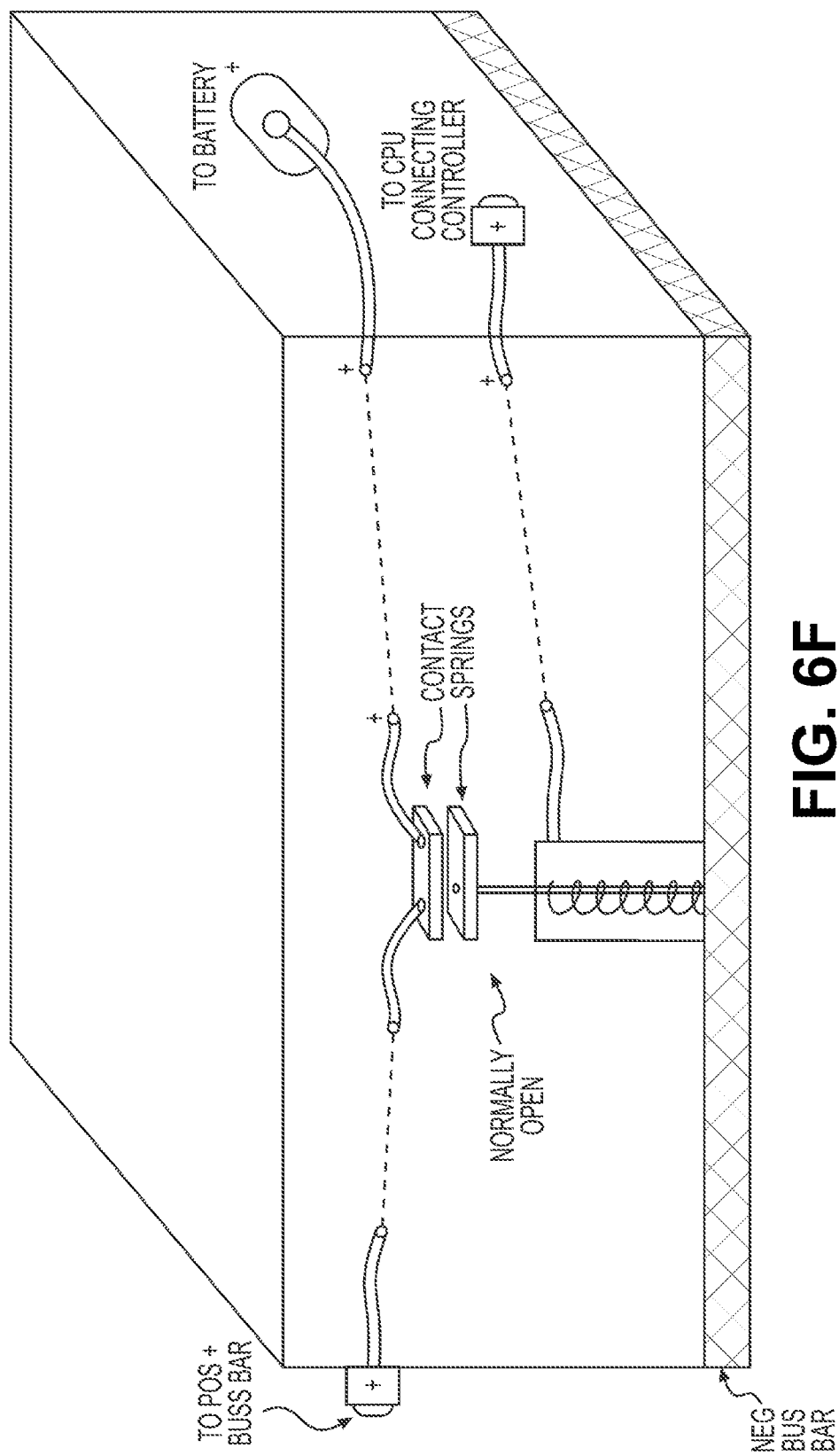
FIG. 6F is a schematic representation of a battery control system enclosure according to aspects of this disclosure.
Figure 6H:
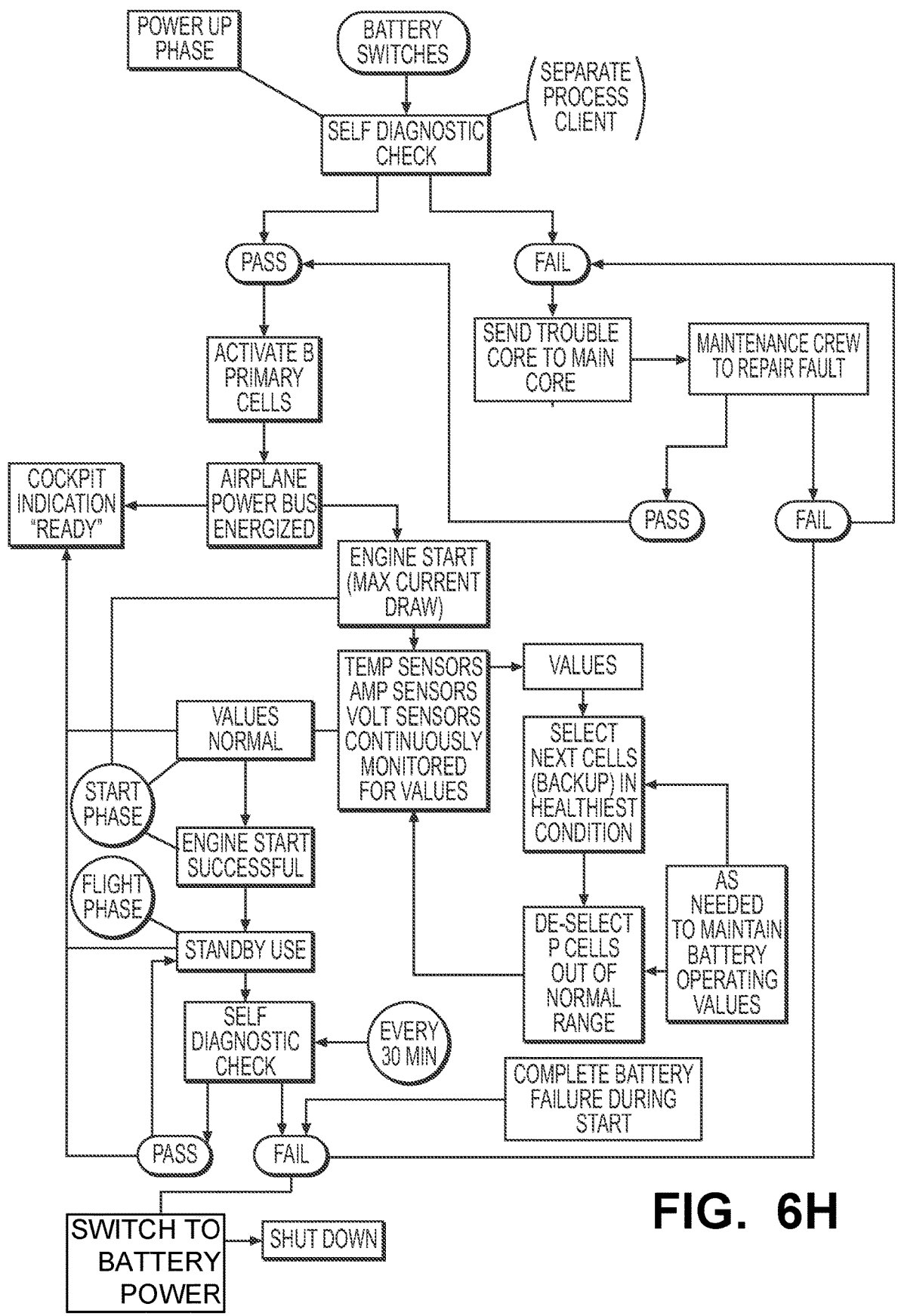
FIG. 6H is a schematic representation of a battery control system flow chart according to aspects of this disclosure.
Figure 6I:
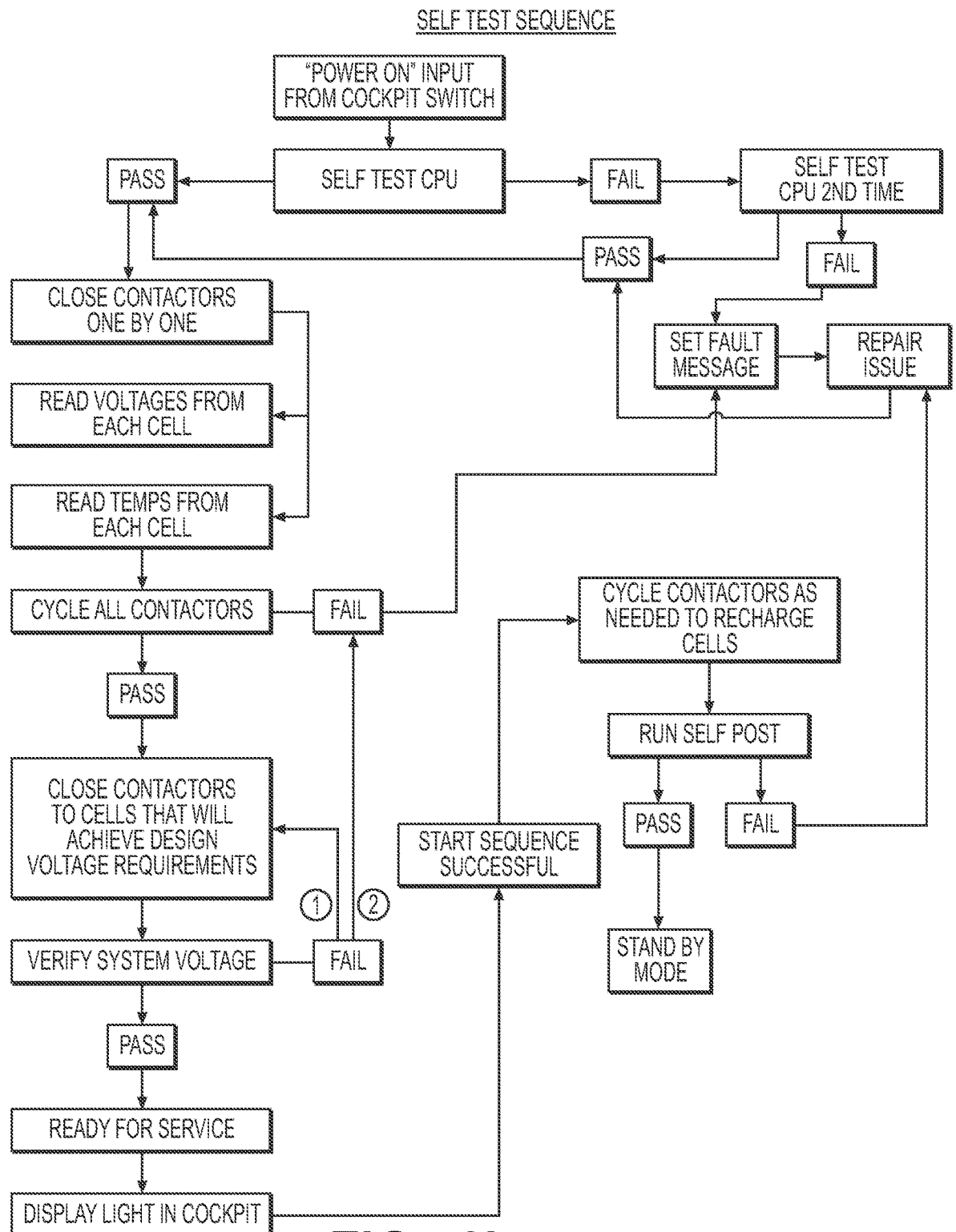
FIG. 6I is a schematic representation of a battery control system flow chart for a self check system according to aspects of this disclosure.

FIGS. 6A-6I further illustrate various aspects of battery systems configured in accordance with some embodiments of the present technology. It is noted that the battery systems and associated control systems disclosed herein are described in the context of airplane power management, but the example airplane environment is not limiting of the fields in which the technology can be used. The battery system, battery cells, and associated enclosures described herein may be used in any environment, whether for a vehicle or mobile use or stationary/permanent configurations. For example, FIG. 6A illustrates a further example embodiment of the battery system, such as the controller 600 which may be a distributed controller that incorporates appropriate processors, memory and computerized software to manage operation of the battery units, individual battery cells, etc. FIG. 6B illustrates a further example embodiment of the back up battery units B1, B2, B3 that may be positioned in an appropriate enclosure and connected to the controller of FIG. 6A as necessary for control system configuration. FIG. 6C illustrates a further example embodiment of the components/design/configuration that communicate with the controller, such as sensors for Temperature, Voltage, and Current attached to individual primary battery cells P1-P8. FIG. 6D illustrates an example embodiment of an individual battery cell 625 having power and data connections for working in conjunction with computerized control systems such as the controller of FIG. 6A. FIG. 6E illustrates a further example embodiment of the controller 600 and the connectors for data and power, as well as connectors C that implement electronic communication among the controller 600, power bus bars, data bus bars, sensors and the like. FIG. 6F illustrates a further example operational flow of the battery system communicated by contacts 660 that open and close in accordance with appropriate switching theory and computerized algorithms to enable control of the power grid for which a battery system is associated. FIG. 6G illustrates a further example of a container for housing a plurality of battery cells and provides connectors T, V, A, Al for temperature, voltage, and amperage sensors and associated power control of a sensor system implemented as a monitoring configuration for an enclosure that houses a plurality of battery cells. operational flow of a self-test sequence for the battery system.

Figure 7:
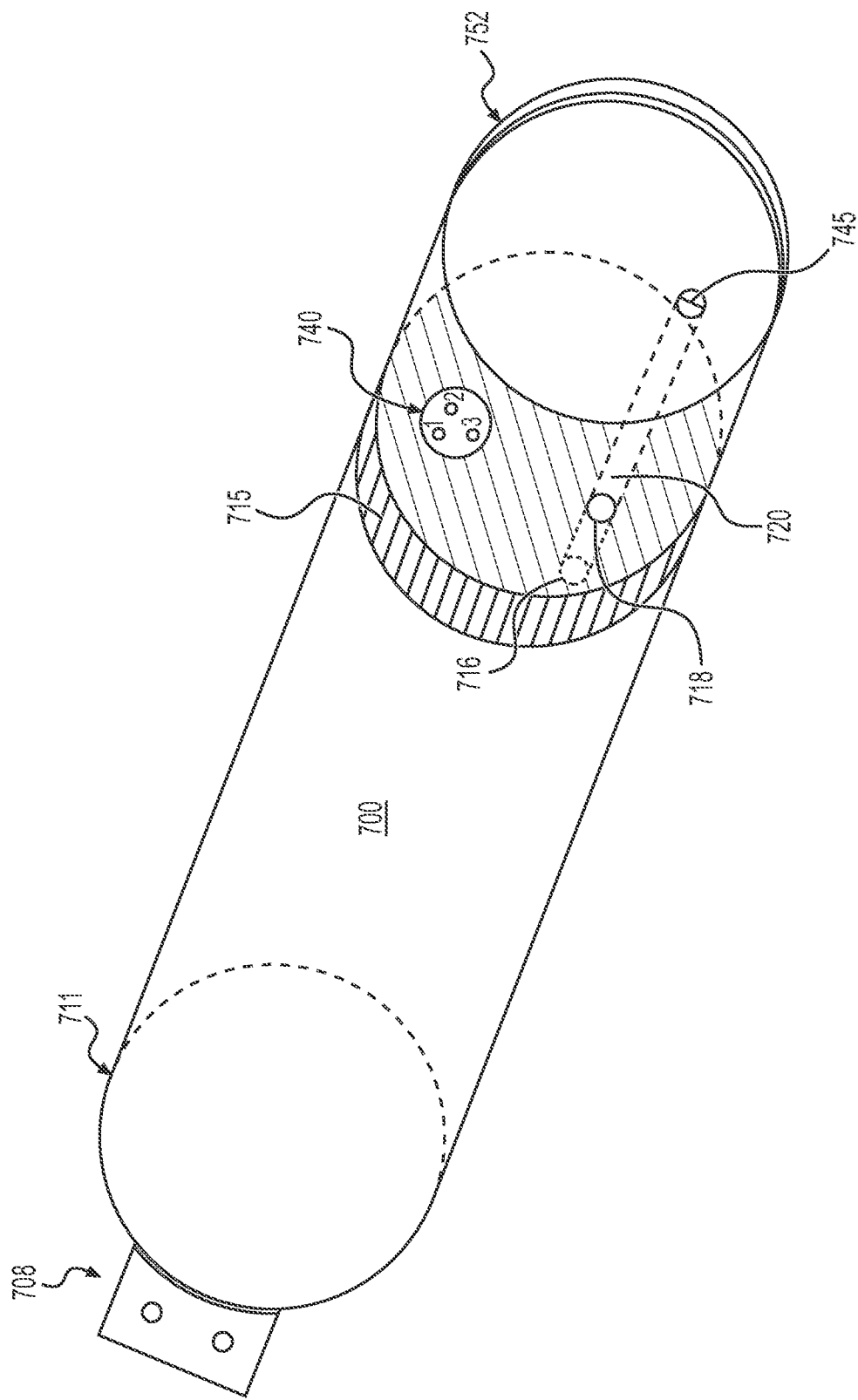
FIG. 7 is a schematic view of an external housing for an energy storage cell according to the disclosure herein.
Figure 8:
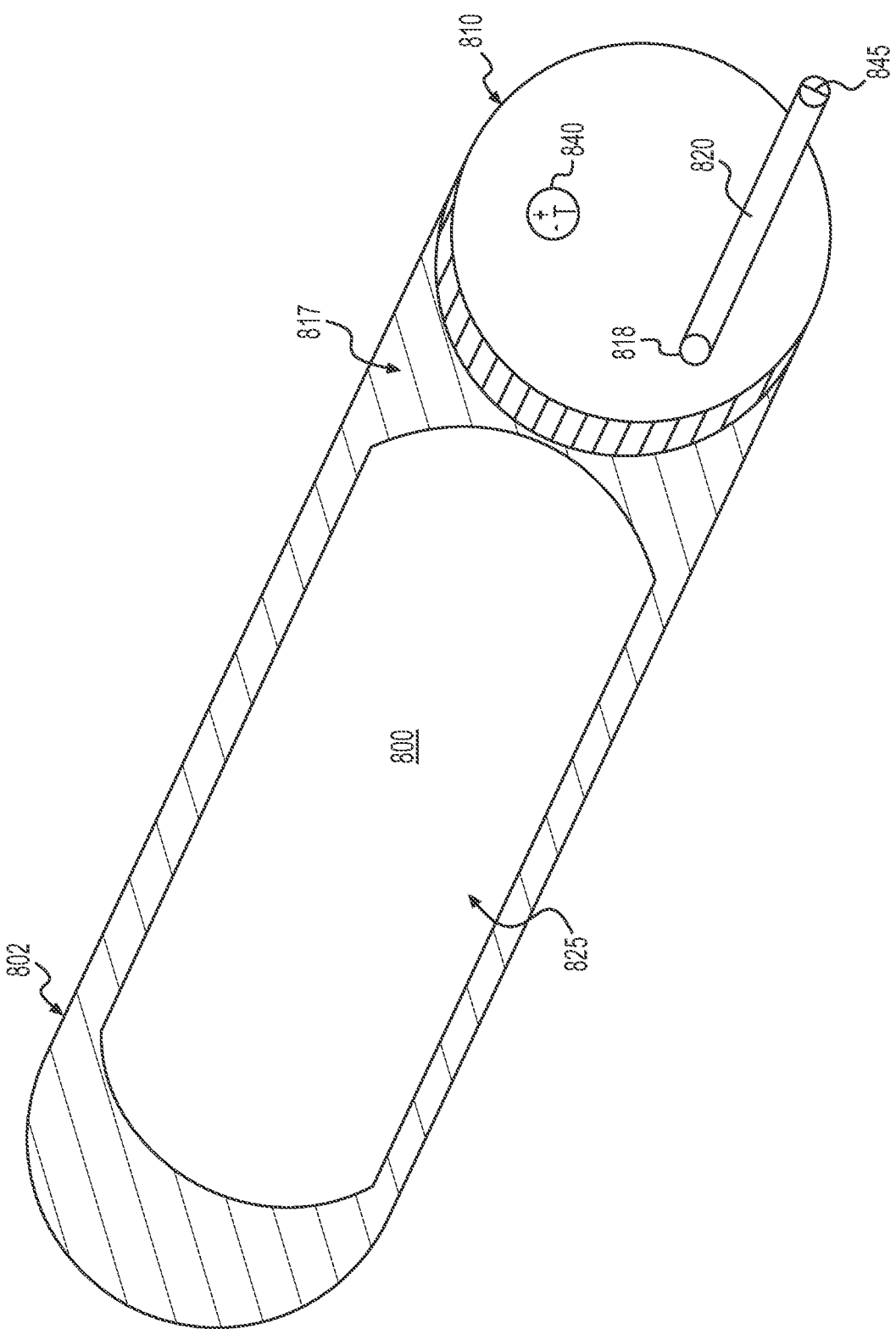
FIG. 8 is a schematic view of a cell container for an energy storage cell according to the disclosure herein.
Figure 9:
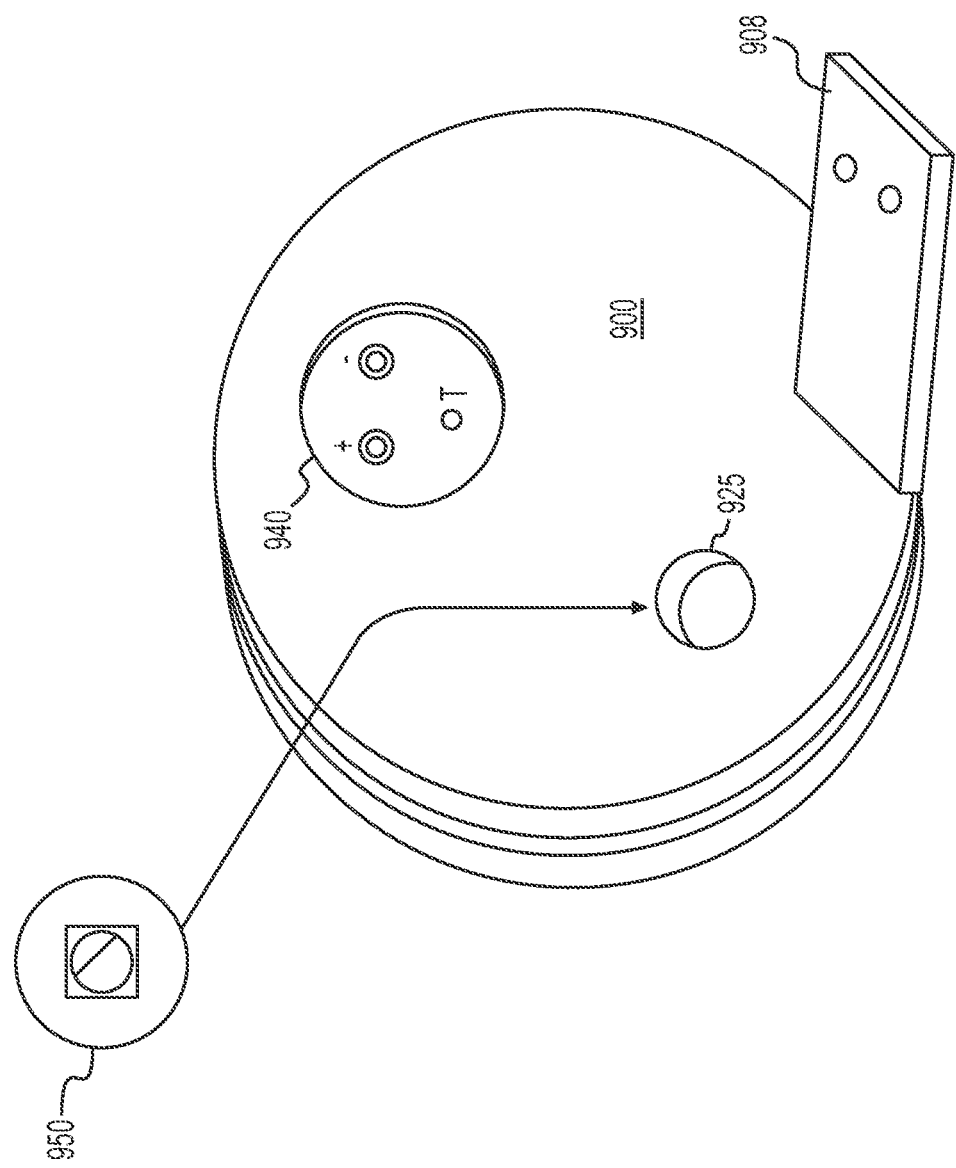
FIG. 9 is a schematic view of an end cap for the external housing as shown in FIG. 7 and described according to this disclosure.

A battery system according to this disclosure may incorporate the construction shown in FIGS. 7-9 of this document. All components are for example uses only, and certain modifications may be available to customize the system for the use at hand. It is noteworthy that all embodiments of this system are equally applicable to environments other than airplane examples discussed herein. The battery system, the control system, and all intermediate components may be used in any vehicle that would benefit from the characteristics as described, whether the vehicle is an automotive, marine, or aerospace application. The same technology can be used in stationary environments as well, such as for primary and back up battery power for mission critical systems.

In one embodiment, a battery system includes an energy storage cell 800 and a cell container 802 surrounding the energy storage cell, wherein the cell container includes at least one power output terminal 840 and a test port 818. For use with the cell container 802, an external housing 700 defines an enclosure configured to encompass the cell container. A conduit 720, 820 attached to the test port 818 of the cell container is accessible through the external housing 700. A valve 745, 845 is positioned within the conduit 720, 820 and controlling fluidic flow through the conduit. The conduit 720, 820 may be bifurcated into a cell container conduit 820 and an external housing conduit 720 as shown in the figures.

The battery system may incorporate active sensors on, near, or within the battery unit or cell 800 to monitor for the above describe operating conditions associated with each cell. To accommodate such a sensor within the cell container 802, at least a first sensor communication terminal 840 is accessible through the cell container 802. In one non-limiting embodiment, the first sensor communication terminal 840 is connected to a temperature sensor within the cell container. In fact, the first sensor communication terminal 840 may provide uni-directional or bi-directional communications to any sensor apparatus within the cell container 802. For example, the first sensor communication terminal may be connected to a detection sensor tuned to determine a presence of a target analyte within the cell container. Such a target analyte can be analyzed to determine chemical reactions at the cell site, off gassing that indicates certain operating conditions, and the like.

In order to accommodate communications with each individual battery cell 800, a battery system according to this disclosure may utilize a cell end cap 810 securing the cell container 802. In one embodiment, the cell endcap defines the test port connected to a conduit that provides access to an active battery unit. To reduce weight and to promote electrical insulation, the cell endcap may be made of a carbon fiber polymer.

The battery system may utilize a series of valves to provide access to the interior of the cell container 802. In one non-limiting embodiment, the cell container 802 includes a carbon fiber shell defining the container. The valve(s) 745, 845 may be configured for an opened position and a closed position respectively exposing and sealing cell container relative to an outside environment. In the embodiment shown in FIG. 8, the conduit is a cell conduit 820 connected to the test port 818 of the cell end cap 810, and the valve is a cell valve 845 positioned within the cell conduit 820. During certain uses, the cell valve 845 is configured for an opened position to allow access into the cell container 802 from the cell conduit 820 (e.g., to pressurize the cell conduit to normal sea level pressure). The overall conduits and valves allow for various test circuits to also be connected to the cell conduit to gain access to an interior of said cell container. The test circuits may be part of the above noted control system that checks on cell pressure, temperature, air quality and the like. In other words, a series of valves and conduits from an external environment into the cell container 802 allow for bi-directional fluidic flow including gaseous flow and/or liquid flow with flow rates and pressure rates subject to monitoring by the overall battery system. In one non-limiting embodiment, the cell container 802 can be filled with both the battery cell 800 and a flame retardant liquid or gas 817 for added protection.

For added protection and to further arrest any thermal or pressure run away conditions, the cell container 802 fits within the external housing 700. The external housing 700 surrounds the cell container in part with at least one inner bulkhead 715 sealing the external housing and defining at least a second sensor communication terminal 740 having access to an interior of the external housing and therefore to the first sensor communication terminal 840 of the cell container. An interior port 716, 718 defined by the inner bulkhead 715 of the external housing is configured to connect to the test port 818 of said cell container 802. After all internal portions are in place in the cell container 802 and the external housing 700, a housing end cap 900, illustrated in FIG. 9, may be placed onto the external housing 700 such that the test port 818 of the cell container 802 and the interior port 716, 718 of the inner bulkhead 715 are configured to connect to an access port 925 defined within the housing endcap 900. An optional cap 950 is also available for the above described pressure tube opening/pressure port 925. Similarly, the first and second sensor communication terminals are similarly designed to connect to a third sensor communication terminal 940 of the housing endcap 900. In one non-limiting embodiment, the cap may include an attachment footer 908 for attaching the assembly to a securing structure, like a wall.

A battery system as disclosed herein, therefore, utilizes an external housing conduit 720 connecting the access port 925 within the housing endcap 900 to the interior port 716, 718 of the inner bulk head 715 and at least one valve in the system is positioned within the external housing conduit 720. This valve allows for a series of conditions to be met before opening any interior portions of the system compartments to an exposed environment. In short, a battery system described herein includes the passageway of a cell container conduit 820 extending from the test port 818 of the cell endcap 810 to the interior port 716, 718 of the inner bulkhead 715 and the external housing conduit 720 extending from the inner bulkhead 715 to the access port 925 of the housing endcap 900. The space between the inner bulk head 715 and the end cap 810 may be filled with a high temperature resistant sealant. The end cap 810 may be made of numerous metals but possibly carbon fiber reinforced polymers as well.

In one non-limiting embodiment, a battery system includes a cell container 802 that is pressurized to sea level atmospheric pressure with a compressed gas surrounding the energy storage cell 800 therein. The compressed gas may be an inert gas at about 14.75 PSIG. In turn, the external housing 700 is pressurized to sea level atmospheric pressure with a liquid or gas additive positioned between said cell container 802 and the external housing 700. A battery system may include the liquid additive in the form of a flame-retardant agent (liquid or gas) 817. For any given battery cell that reaches a combustion point, the flame-retardant fluid within the external housing not only provides a heat sink to control such thermal runaway but also extinguishes any fire that could begin. The flame retardant fluid further serves as a heat sink for the battery units during an active operation of the battery units.

The cell design is not limited to a distributed system or a single cell. In another version, the cell design will carry a single older style battery or even banks of batteries located within a single pressurized enclosure. In essence, in some embodiments, the encasement or enclosure 700, will contain one or more batteries and can be retrofitted to include any currently available battery currently on the market. It can be constructed in such a manner as to conform to irregular shapes to fit a particular location of a given installation.

Battery enclosures according to this disclosure can be manufactured to be a form fitting receptacle for multiple battery cells and may be formed to conform to a shape of a given application. The formed shape of the battery enclosure may match any pre-designed specifications to utilize space and placement of the enclosure or to track a shape of an existing boundary or wall in which the battery enclosure must fit. In this way, a battery enclosure and integral battery cells according to this disclosure may be a direct drop in replacement for currently used battery configurations for the application at hand.

Figure 11:
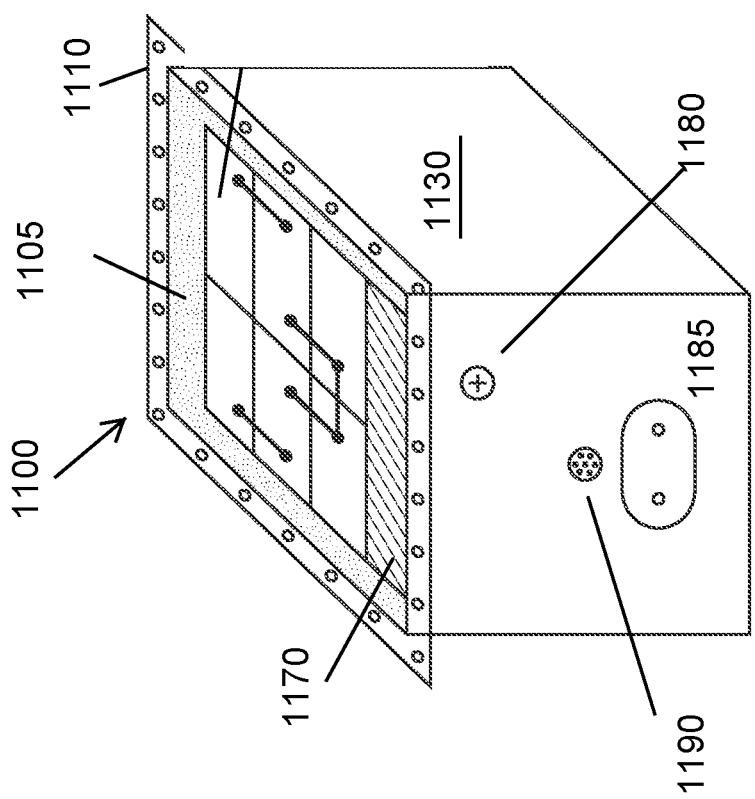
FIG. 11 is a schematic representation of a bottom housing box for a battery control system according to aspects of this disclosure.
Figure 10:
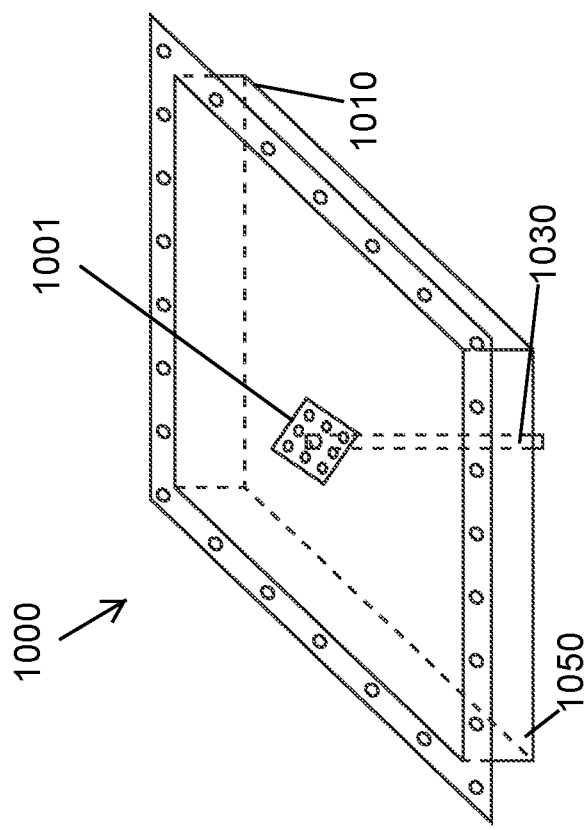
FIG. 10 is a schematic representation of a lid for a battery control system enclosure according to aspects of this disclosure.

FIGS. 10 and 11 illustrate yet another battery enclosure in accordance with the technology herein. The battery enclosure may include two-part construction of a lid 1000 that fits onto a box type enclosure 1100. The lid includes a pressurization port 1030 extending from the lid 1000 to the box 1100. The pressurization port 1030 may be used for nitrogen pressurization and then be covered by cover 1001 welded or otherwise attached over the pressurization port 1030. The lid may be coated with a sealant that fire suppressant for additional protection. A bottom of the lid is designed to melt first and may be infused with a fire-suppressant gas or liquid serving as a fire suppressing agent that can be directed toward the battery packs in the event of melting flange or bottom of the lid. In one embodiment, the fire suppressing agent may be enclosed within an aluminum chamber 1010 containing a fire suppression fluid. The lid and the box may utilize a bead 1050 of a high temperature sealant on flange surfaces that meet to close the lid by known manners of attachment.

FIG. 11 illustrates more details of the box enclosure 1100. The bead 1050 of high temperature sealant on the lid has a companion bead 1130 on the box. The box is configured to house numerous battery cells or battery packs as described above. In one non-limiting embodiment, the battery cells are connected in parallel. The box 1100 may be a titanium chamber of appropriate specifications for the use at hand. The box 1100 may incorporate an integral computerized system for a battery management system 1170 or may have a communications connector 1190 to connect the battery enclosure to a distributed control system or other server-based computer facilities necessary to monitor the enclosure 1100 and prevent failure. The enclosure may be formed with a water-cooling jacket that contains fire suppressant agents that can be released when the battery management system detects conditions needing emergency attention to prevent a fire. A one way vent valve 1180 is present for pressure control. In one embodiment, the box 1100 is a layered construction of aluminum and titanium.

In any of the embodiments herein, the systems are configured for an optional addition of ARINC 429 communication system to transfer data from BMS (Battery management system) 1125 to another control system by either wired or wireless communication. In one non-limiting embodiment, an on board aircraft computer system may be the over arching control system with which the BMS communicates, but other applications are within the scope of this disclosure.

As noted above, the battery enclosures of this technology may be any shape such as the above described cylinders or cubes. The designs optionally use a Titanium (Ti) outer shell with a Carbon Fiber (CFRP) inner chamber which is standard in enclosures already. This disclosure adds an aluminum (AL) inner chamber, instead of the CFRP, that is designed to melt at certain temperatures based on the thickness of the AL therefore releasing the fire suppression agent into the battery cells in case of a fire as noted above.

The embodiments described above may include features that are included or excluded as the need at hand dictates. In one non-limiting embodiment, a battery system includes an energy storage cell 800, a cell container 802 surrounding the energy storage cell, and the cell container 802 has at least one power output terminal 840 and a test port 818. An external housing 700 defines an enclosure configured to encompass the cell container 802, and an inner conduit 718 runs through an inner bulk head 715 to the test port 818 of the cell container and is accessible through the external housing 802. A valve 745 is positioned within the conduit 718 and controls fluidic and gaseous flow through the inner conduit 718 to the interior port 716. This assembly allows at least a first sensor communication terminal to accessible through the cell container 802 and through an external housing 700. The first sensor communication terminal may be connected to a temperature sensor within the cell container 802. The first sensor communication terminal may otherwise be connected to a detection sensor tuned to determine a presence of a target analyte within the cell container 802. A cell end cap 810 secures the cell container 802. The cell endcap 810 defines the cell test port 818 connected to the structural conduit 820. The structural conduit 820 is configured to fit within and pass through the inner conduit 718 that extends through the inner bulkhead 715 of the external housing 700. The cell endcap 810 may be made of a carbon fiber polymer. A valve 845 is configured for an opened position and a closed position respectively exposing and sealing the cell container 802 relative to an outside environment. A conduit associated with the cell 800 is a cell conduit 820 connected to the cell test port 818, and the valve is a cell valve 845 positioned within the cell conduit 820 and configured for an opened position to allow access into the cell container 802 from the cell conduit 820. In one non-limiting embodiment, a test circuit as illustrated in FIGS. 6A-6E is connected to the cell conduit 820 to gain access to an interior 817 of the cell container. The fluidic flow may be a gaseous flow and/or liquid flow and may include a fire-retardant agent. The test circuit includes a pressure test circuit that tracks a pressure reading for an interior of the cell container. The test circuit may include an air quality test circuit that tracks a presence of at least one analyte in the cell container.

In one non-limiting battery and power management system described herein, one inner bulkhead 715 seals the external housing 700 and defines at least a second sensor communication terminal 740 having access points 1, 2, 3 to an interior of the external housing 700. Furthermore, an interior port 716 defined by the inner bulkhead 715 of the external housing 700 is configured to connect to the test port 818 of the cell container 802 and to an access port 925 in a housing end cap 900 via corresponding conduit structures. The respective shape and position of the test port 818 of the cell container 802 and the interior port 716 of the inner bulkhead 715 are configured to connect to an access port 925 defined within the housing endcap 900.

A cell container conduit 820 connects the access port 925 within the housing endcap 900 to the interior port 718 of the inner bulkhead 715 and the valve is positioned within cell container conduit. Connecting conduits of the system, therefore, run from an external environment into the interior of a cell container 802. The conduits may include a cell container conduit 820 extending from an interior of the cell container 802, proximate the cell 800, to the test port 925 of the cell endcap 900. The conduits connect the external environment through a system of valves 745, 845 and through inner port 716 of the inner bulkhead 715, and the cell container conduit 820 extends from the inner bulkhead 715 to the access port 925 of the housing endcap 900. The cell container 802 is pressurized to sea level atmospheric pressure with a compressed gas surrounding said energy storage cell. The compressed gas may be an inert gas at about 14.75 PSIG. The external housing 700 is pressurized to sea level atmospheric pressure with a liquid additive positioned between said cell container and said external housing. The liquid additive is a flame-retardant fluid or may be a gas additive that is likewise flame retardant. The flame retardant fluid further serves as a heat sink for the battery units during an active operation of the battery units.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

The invention claimed is:

1. A battery system comprising:
   an energy, storage cell;
   a cell container surrounding the energy storage cell, the cell container comprising at least one power output terminal and a test port;
   an external housing defining an enclosure configured to encompass the cell container;
   a conduit attached to the test port of the cell container and accessible through the external housing; and
   a valve positioned within the conduit and controlling fluidic flow through the conduit.

2. The battery system according to claim 1, comprising at least a first sensor communication terminal accessible through the cell container.

3. The battery system according to claim 2, wherein said first sensor communication terminal is connected to a temperature sensor within the cell container.

4. The battery system according to claim 2, wherein said first sensor communication terminal is connected to a detection sensor tuned to determine a presence of a target analyte within the cell container.

5. The battery system according to claim 1, further comprising a cell end cap securing said cell container.

6. The battery system according to claim 5, wherein said cell end cap defines the test port connected to said conduit.

7. The battery system according to claim 5, wherein said cell end cap comprises a carbon fiber polymer.

8. The battery system according to claim 1, wherein said valve is configured for an opened position and a closed position respectively exposing and sealing said cell container relative to an outside environment.

9. The battery system according to claim 8, wherein said conduit is a cell conduit connected to said test port, and said valve is a cell valve positioned within said cell conduit and configured for an opened position to allow access into the cell container from said cell conduit.

10. The battery system according to claim 9, further comprising a test circuit connected to said cell conduit to gain access to an interior of said cell container.

11. The battery system according to claim 9, wherein the fluidic flow comprises gaseous flow and/or liquid flow.

12. The battery system according to claim 11, wherein the test circuit comprises a pressure test circuit that tracks a pressure reading for an interior of the cell container.

13. The battery system according to claim 11, wherein the test circuit comprises an air quality test circuit that tracks a presence of at least one analyte in the cell container.

14. The battery system according to claim 1, further comprising at least one inner bulkhead sealing the external housing and defining at least a second sensor communication terminal having access to an interior of the external housing.

15. The battery system according to claim 14, further comprising an interior port defined by said inner bulkhead of said external housing, said interior port configured to connect to said test port of said cell container.

16. The battery system according to claim 15, further comprising a housing end cap, wherein said test port of said cell container and said interior port of said inner bulkhead are configured to connect to an access port defined within the housing end cap.

17. The battery system according to claim 15, further comprising a cell container conduit connecting said access port within the housing end cap to said interior port of said inner bulkhead and said valve is positioned within said cell container conduit.

18. The battery system according to claim 15, wherein said conduit comprises a cell container conduit extending from said test port of said cell end cap to said interior port of said bulkhead and said cell container conduit extending from said bulkhead to said access port of said housing end cap.

19. The battery system according to claim 1, wherein said-cell container-is pressurized to sea level atmospheric pressure with a compressed gas surrounding said energy storage cell.

20. The battery system according to claim 19, wherein said compressed gas is an inert gas at 14.75 PSIG.

21. The battery system according to claim 1, wherein said external housing is pressurized to sea level atmospheric pressure with a liquid additive positioned between said cell container and said external housing.

22. The battery system according to claim 21, wherein said liquid additive is a flame-retardant fluid.

23. The battery system according to claim 22, wherein said flame retardant fluid further serves as a heat sink for the energy storage cell during an active operation of the energy storage cell.

24. A system comprising:
a plurality of battery systems according to claim 1,
a controller configured to connect/disconnect each battery system according to its physical status to/from a device/system monitoring the plurality of battery systems.

* * * * *